United States Patent
Leggette et al.

(10) Patent No.: US 12,535,948 B2
(45) Date of Patent: Jan. 27, 2026

(54) DYNAMICALLY ADJUSTING STORAGE RESOURCES IN A VAST STORAGE NETWORK

(71) Applicant: Pure Storage, Inc., Mountain View, CA (US)

(72) Inventors: Wesley B. Leggette, Chicago, IL (US); Bart R. Cilfone, Marina del Rey, CA (US)

(73) Assignee: Pure Storage, Inc., Santa Clara, CA (US)

(*) Notice: Subject to any disclaimer, the term of this patent is extended or adjusted under 35 U.S.C. 154(b) by 519 days.

(21) Appl. No.: 17/305,004

(22) Filed: Jun. 29, 2021

(65) Prior Publication Data
US 2021/0326043 A1 Oct. 21, 2021

Related U.S. Application Data

(63) Continuation of application No. 16/807,076, filed on Mar. 2, 2020, now Pat. No. 11,068,163, which is a
(Continued)

(51) Int. Cl.
| | |
|---|---|
| H04L 67/1019 | (2022.01) |
| G06F 3/06 | (2006.01) |
| G06F 11/10 | (2006.01) |
| G06F 21/44 | (2013.01) |
| G06F 21/62 | (2013.01) |
| G11C 25/00 | (2006.01) |

(Continued)

(52) U.S. Cl.
CPC .......... *G06F 3/0604* (2013.01); *G06F 3/0619* (2013.01); *G06F 3/0638* (2013.01);
(Continued)

(58) Field of Classification Search
None
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay |

(Continued)

FOREIGN PATENT DOCUMENTS

| | | |
|---|---|---|
| CA | 2439692 A1 | 9/2002 |

OTHER PUBLICATIONS

Using Erasure Codes Efficiently for Storage in a Distributed System. Aguliera. IEEE. (Year: 2005).*
(Continued)

*Primary Examiner* — Venkat Perungavoor
(74) *Attorney, Agent, or Firm* — Katz Ruby & Carle LLP; Katherine C. Stuckman; Bruce E. Stuckman

(57) ABSTRACT

A method begins by determining storage performance for a set of storage resources of the storage network, where data is error encoded into pluralities of sets of encoded data slices in accordance with error encoding parameters, and, for a set of encoded data slices, the error encoding parameters include a decode threshold number and a pillar width threshold number. The method continues by determining a storage provisioning implementation for the set of storage resources based on the storage performance and a storage performance range threshold. The method continues by facilitating the storage provisioning implementation to produce an updated set of storage resources. The method continues by maintaining storage of the set of encoded data slices in accordance with the storage provisioning implementation, where the decode threshold number of encoded data slices of the set of encoded data slices remains available during the facilitating the storage provisioning implementation.

20 Claims, 26 Drawing Sheets

Related U.S. Application Data continuation of application No. 16/201,486, filed on Nov. 27, 2018, now abandoned, which is a continuation-in-part of application No. 16/136,761, filed on Sep. 20, 2018, now Pat. No. 10,505,915, which is a continuation of application No. 15/427,860, filed on Feb. 8, 2017, now Pat. No. 10,162,524, which is a continuation-in-part of application No. 14/843,022, filed on Sep. 2, 2015, now Pat. No. 9,602,496, which is a continuation of application No. 14/148,198, filed on Jan. 6, 2014, now Pat. No. 9,143,499, which is a continuation of application No. 13/180,675, filed on Jul. 12, 2011, now Pat. No. 8,627,114.

(60) Provisional application No. 61/369,812, filed on Aug. 2, 2010.

(51) Int. Cl.
| | |
|---|---|
| *H04L 1/00* | (2006.01) |
| *H04L 1/06* | (2006.01) |
| *H04L 9/40* | (2022.01) |
| *H04L 67/04* | (2022.01) |
| *H04L 67/10* | (2022.01) |
| *H04L 67/1004* | (2022.01) |
| *H04L 67/1097* | (2022.01) |
| *H04L 67/306* | (2022.01) |
| *H04L 69/22* | (2022.01) |
| *G11C 29/04* | (2006.01) |
| *H03M 13/00* | (2006.01) |
| *H03M 13/15* | (2006.01) |

(52) U.S. Cl.
CPC ............ *G06F 3/064* (2013.01); *G06F 3/0661* (2013.01); *G06F 3/067* (2013.01); *G06F 3/0689* (2013.01); *G06F 11/1076* (2013.01); *G06F 21/44* (2013.01); *G06F 21/6218* (2013.01); *H04L 1/0045* (2013.01); *H04L 1/0057* (2013.01); *H04L 1/0061* (2013.01); *H04L 1/06* (2013.01); *H04L 63/08* (2013.01); *H04L 63/101* (2013.01); *H04L 67/04* (2013.01); *H04L 67/10* (2013.01); *H04L 67/1097* (2013.01); *H04L 67/306* (2013.01); *H04L 69/22* (2013.01); *H03M 13/1515* (2013.01); *H03M 13/6312* (2013.01); *H04L 63/0428* (2013.01)

(56) References Cited

U.S. PATENT DOCUMENTS

| | | | |
|---|---|---|---|
| 5,485,474 A | 1/1996 | Rabin | |
| 5,774,643 A | 6/1998 | Lubbers | |
| 5,802,364 A | 9/1998 | Senator | |
| 5,809,285 A | 9/1998 | Hilland | |
| 5,890,156 A | 3/1999 | Rekieta | |
| 5,987,622 A | 11/1999 | Lo Verso | |
| 5,991,414 A | 11/1999 | Garay | |
| 6,012,159 A | 1/2000 | Fischer | |
| 6,058,454 A | 5/2000 | Gerlach | |
| 6,128,277 A | 10/2000 | Bruck | |
| 6,175,571 B1 | 1/2001 | Haddock | |
| 6,192,472 B1 | 2/2001 | Garay | |
| 6,256,688 B1 | 7/2001 | Suetaka | |
| 6,272,658 B1 | 8/2001 | Steele | |
| 6,301,604 B1 | 10/2001 | Nojima | |
| 6,356,949 B1 | 3/2002 | Katsandres | |
| 6,366,995 B1 | 4/2002 | Vilkov | |
| 6,374,336 B1 | 4/2002 | Peters | |
| 6,415,373 B1 | 7/2002 | Peters | |
| 6,418,539 B1 | 7/2002 | Walker | |
| 6,449,688 B1 | 9/2002 | Peters | |
| 6,567,948 B2 | 5/2003 | Steele | |
| 6,571,282 B1 | 5/2003 | Bowman-Amuah | |
| 6,609,223 B1 | 8/2003 | Wolfgang | |
| 6,718,361 B1 | 4/2004 | Basani | |
| 6,760,808 B2 | 7/2004 | Peters | |
| 6,785,768 B2 | 8/2004 | Peters | |
| 6,785,783 B2 | 8/2004 | Buckland | |
| 6,792,424 B1 | 9/2004 | Burns | |
| 6,826,711 B2 | 11/2004 | Moulton | |
| 6,879,596 B1 | 4/2005 | Dooply | |
| 7,003,688 B1 | 2/2006 | Pittelkow | |
| 7,024,451 B2 | 4/2006 | Jorgenson | |
| 7,024,609 B2 | 4/2006 | Wolfgang | |
| 7,080,101 B1 | 7/2006 | Watson | |
| 7,103,824 B2 | 9/2006 | Halford | |
| 7,103,915 B2 | 9/2006 | Redlich | |
| 7,111,115 B2 | 9/2006 | Peters | |
| 7,140,044 B2 | 11/2006 | Redlich | |
| 7,146,644 B2 | 12/2006 | Redlich | |
| 7,171,493 B2 | 1/2007 | Shu | |
| 7,222,133 B1 | 5/2007 | Raipurkar | |
| 7,240,236 B2 | 7/2007 | Cutts | |
| 7,272,613 B2 | 9/2007 | Sim | |
| 7,636,724 B2 | 12/2009 | De La Torre | |
| 8,627,114 B2 | 1/2014 | Resch | |
| 9,081,715 B2 | 7/2015 | Grube | |
| 9,143,499 B2 | 9/2015 | Resch | |
| 10,361,813 B2 * | 7/2019 | Leggette | ............ H04L 67/1097 |
| 2002/0062422 A1 | 5/2002 | Butterworth | |
| 2002/0166079 A1 | 11/2002 | Ulrich | |
| 2003/0018927 A1 | 1/2003 | Gadir | |
| 2003/0037261 A1 | 2/2003 | Meffert | |
| 2003/0065617 A1 | 4/2003 | Watkins | |
| 2003/0084020 A1 | 5/2003 | Shu | |
| 2004/0024963 A1 | 2/2004 | Talagala | |
| 2004/0122917 A1 | 6/2004 | Menon | |
| 2004/0215998 A1 | 10/2004 | Buxton | |
| 2004/0228493 A1 | 11/2004 | Ma | |
| 2005/0091337 A1 | 4/2005 | Reasor | |
| 2005/0100022 A1 | 5/2005 | Ramprashad | |
| 2005/0114594 A1 | 5/2005 | Corbett | |
| 2005/0125593 A1 | 6/2005 | Karpoff | |
| 2005/0131993 A1 | 6/2005 | Fatula, Jr. | |
| 2005/0132070 A1 | 6/2005 | Redlich | |
| 2005/0144382 A1 | 6/2005 | Schmisseur | |
| 2005/0229069 A1 | 10/2005 | Hassner | |
| 2006/0047907 A1 | 3/2006 | Shiga | |
| 2006/0101399 A1 | 5/2006 | Murayama | |
| 2006/0136448 A1 | 6/2006 | Cialini | |
| 2006/0156059 A1 | 7/2006 | Kitamura | |
| 2006/0224603 A1 | 10/2006 | Correll, Jr. | |
| 2007/0079081 A1 | 4/2007 | Gladwin | |
| 2007/0079082 A1 | 4/2007 | Gladwin | |
| 2007/0079083 A1 | 4/2007 | Gladwin | |
| 2007/0088970 A1 | 4/2007 | Buxton | |
| 2007/0174192 A1 | 7/2007 | Gladwin | |
| 2007/0214285 A1 | 9/2007 | Au | |
| 2007/0234110 A1 | 10/2007 | Soran | |
| 2007/0283167 A1 | 12/2007 | Venters, III | |
| 2009/0094251 A1 | 4/2009 | Gladwin | |
| 2009/0094318 A1 | 4/2009 | Gladwin | |
| 2009/0323487 A1 | 12/2009 | Chen | |
| 2010/0023524 A1 | 1/2010 | Gladwin | |
| 2010/0037056 A1 | 2/2010 | Follis | |
| 2010/0037060 A1 | 2/2010 | Irvine | |
| 2010/0199089 A1 | 8/2010 | Vysogorets | |
| 2012/0027134 A1 | 2/2012 | Gladwin | |
| 2013/0304711 A1 | 11/2013 | Resch | |
| 2019/0108368 A1 * | 4/2019 | Gladwin | ............ H04N 21/222 |
| 2022/0374162 A1 * | 11/2022 | Resch | ............ G06F 3/067 |
| 2023/0026842 A1 * | 1/2023 | Kazi | ............ G06F 3/0644 |

OTHER PUBLICATIONS

Memory Mapped ECC: Low-Cost Error Protection for Last Level Caches. Yoon. ICSA. (Year: 2009).*

(56) References Cited

OTHER PUBLICATIONS

STAR: An Efficient Coding Scheme for Correcting Triple Storage Node Failures. Huang. IEEE. (Year: 2008).*
Reliability and Availability Assessment of Storage Area Network Extension Solutions. Qiu. IEEE. (Year: 2005).*
Routing in Delay Tolerant Networks Using Storage Domains. Mundur. (Year: 2006).*
Efficient Data Access for Parallel BLAST. Lin. IEEE. (Year: 2005).*
R-ADMAD: High Reliability Provision for Large-Scale De-duplication Archival Storage Systems. Liu. ACM. (Year: 2009).*
Chung; An Automatic Data Segmentation Method for 3D Measured Data Points; National Taiwan University, pp. 1-8; 1998.
Harrison; Lightweight Directory Access Protocol (LDAP): Authentication Methods and Security Mechanisms; IETF Network Working Group; RFC 4513; Jun. 2006; pp. 1-32.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.
Legg; Lightweight Directory Access Protocol (LDAP): Syntaxes and Matching Rules; IETF Network Working Group; RFC 4517; Jun. 2006; pp. 1-50.
Plank, T1: Erasure Codes for Storage Applications; FAST2005, 4th Usenix Conference on File Storage Technologies; Dec. 13-16, 2005; pp. 1-74.
Rabin; Efficient Dispersal of Information for Security, Load Balancing, and Fault Tolerance; Journal of the Association for Computer Machinery; vol. 36, No. 2; Apr. 1989; pp. 335-348.
Sandhu, Access Control Principles and Practice, IEEE Communications Magazine, Sep. 1994.
Satran, et al.; Internet Small Computer Systems Interface (ISCSI); IETF Network Working Group; RFC 3720; Apr. 2004; pp. 1-257.
Sciberras; Lightweight Directory Access Protocol (LDAP): Schema for User Applications; IETF Network Working Group; RFC 4519; Jun. 2006; pp. 1-33.
Sermersheim; Lightweight Directory Access Protocol (LDAP): The Protocol; IETF Network Working Group; RFC 4511; Jun. 2006; pp. 1-68.
Shamir; How to Share a Secret; Communications of the ACM; vol. 22, No. 11; Nov. 1979; pp. 612-613.
Smith; Lightweight Directory Access Protocol (LDAP): Uniform Resource Locator; IETF Network Working Group; RFC 4516; Jun. 2006; pp. 1-15.
Smith; Lightweight Directory Access Protocol (LDAP): String Representation of Search Filters; IETF Network Working Group; RFC 4515; Jun. 2006; pp. 1-12.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.
Zeilenga; Lightweight Directory Access Protocol (LDAP): Technical Specification Road Map; IETF Network Working Group; RFC 4510; Jun. 2006; pp. 1-8.

* cited by examiner

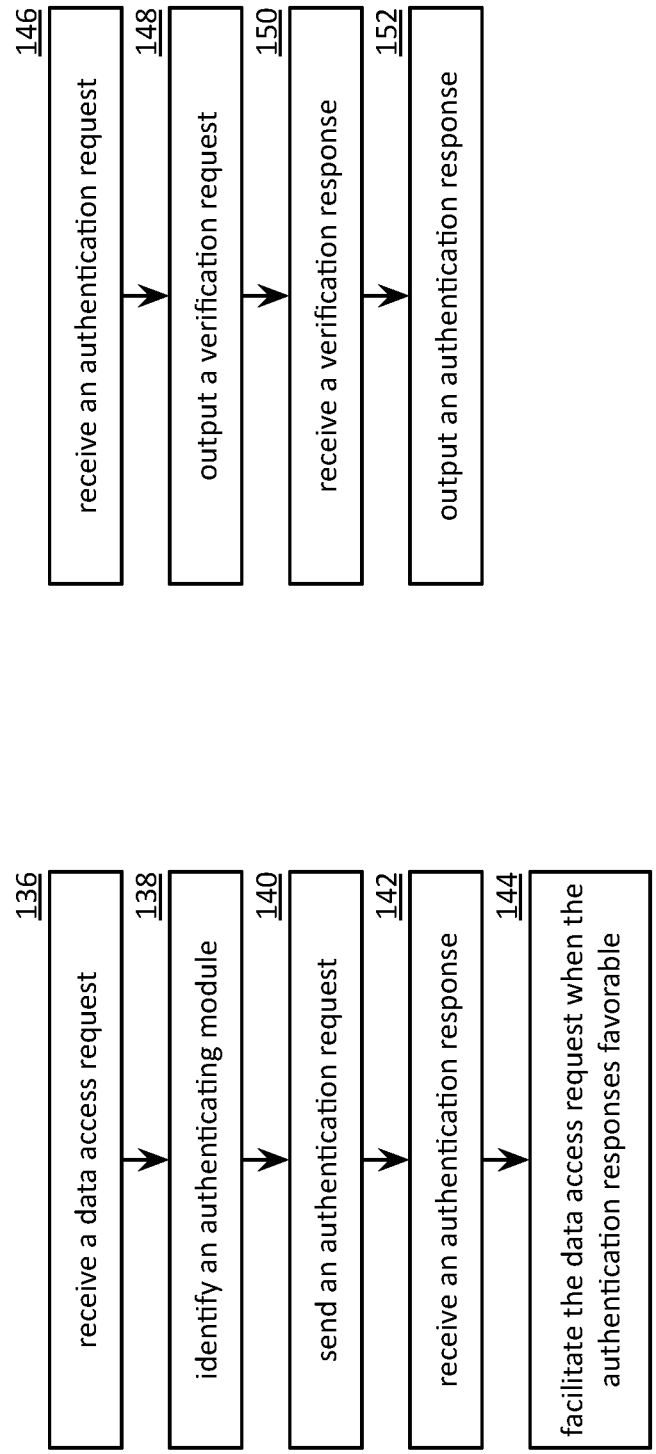

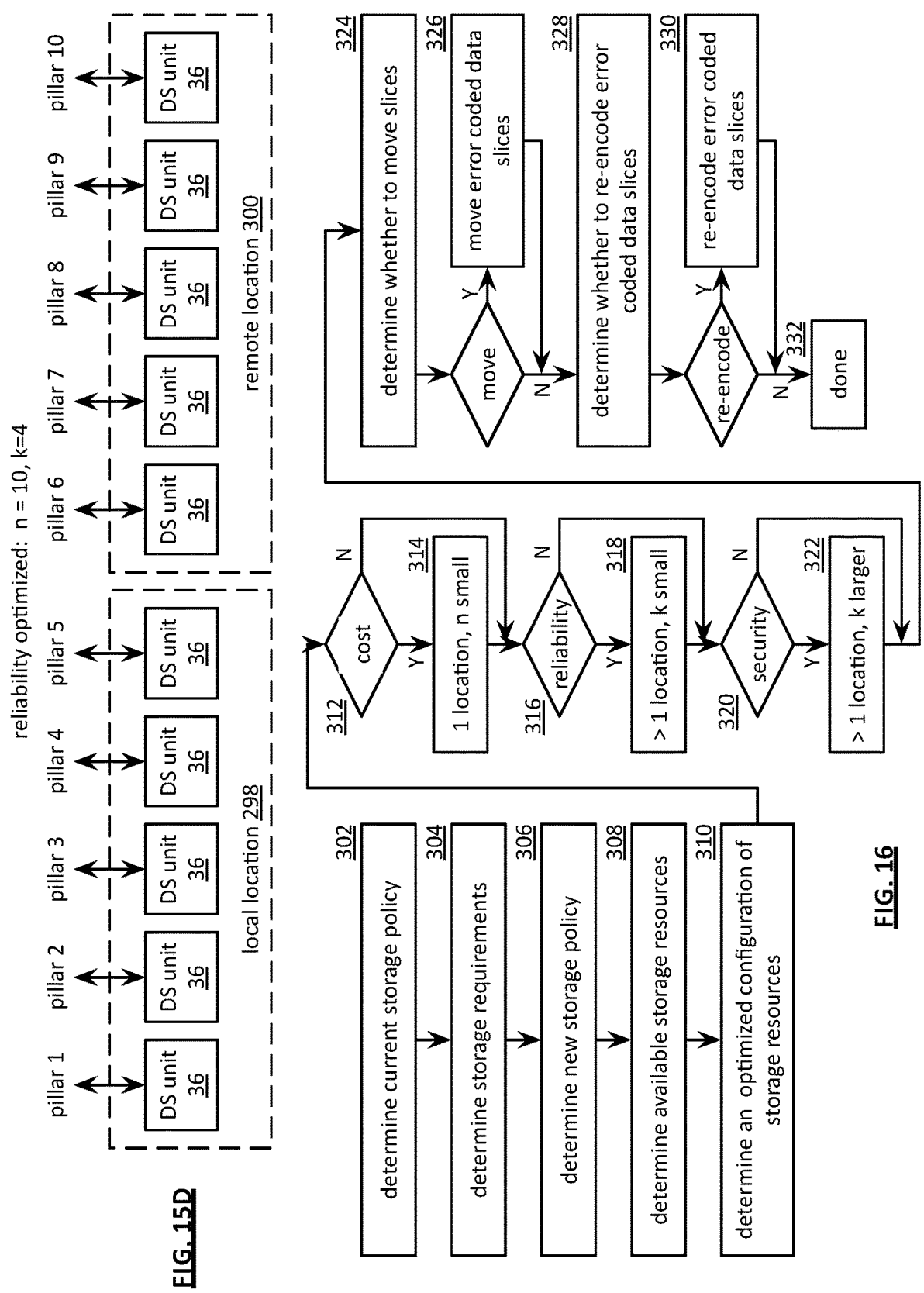

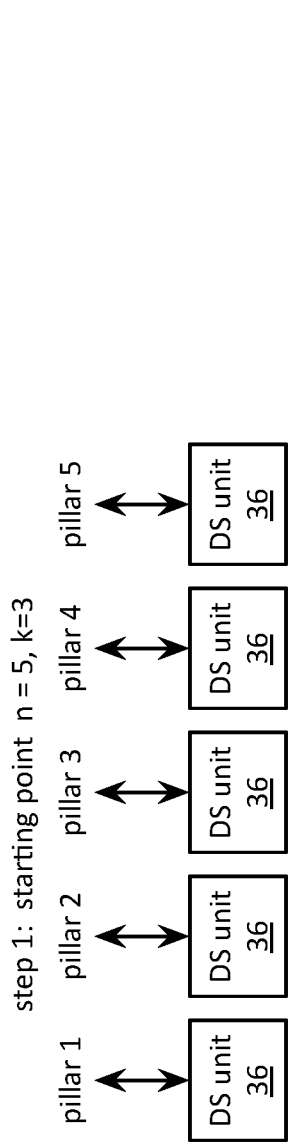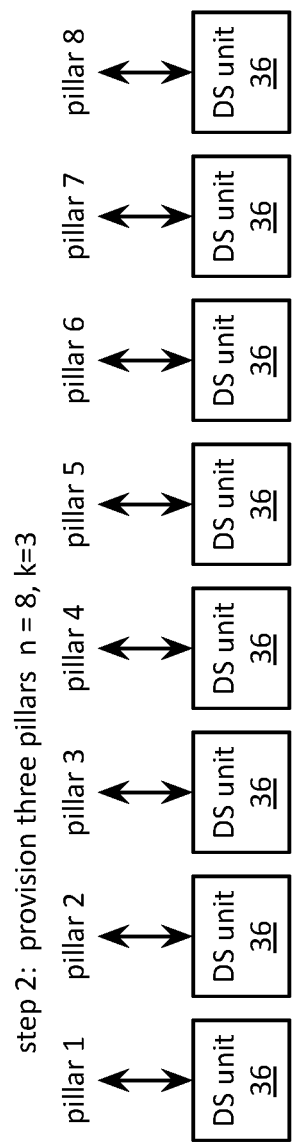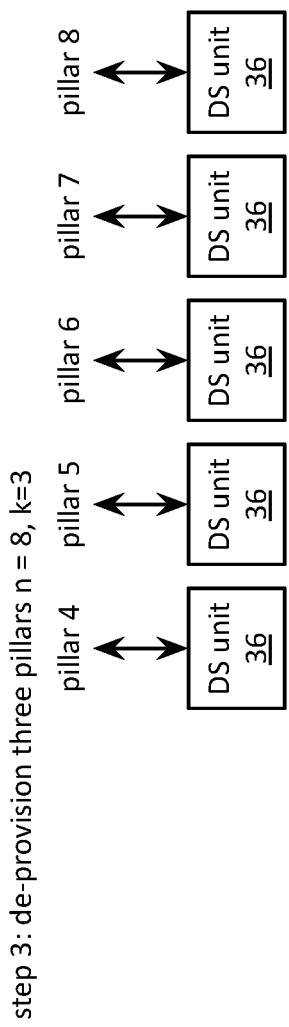

| | wireless configuration and pillar assignments (n=5, k=3) 420 | | | | | | | | | |
|---|---|---|---|---|---|---|---|---|---|---|
| | cost 422 | | performance 424 | | reliability 426 | | balance A 428 | | balance B 430 | |
| | pillars 432 | speed 434 | pillars 436 | speed 438 | pillars 440 | speed 442 | pillars 444 | speed 446 | pillars 448 | speed 450 |
| TR 1 | 1-5 | 1X | 1 | 2X | 1 | 1X | 1 | 1X | 1, 2 | 4X |
| TR 2 | | | 2 | 2X | 2 | 1X | 2 | 1X | 3, 4 | 4X |
| TR 3 | | | 3 | 2X | 3 | 1X | 3 | 1X | 5 | 2X |
| TR 4 | | | 4 | 2X | 4 | 1X | 4, 5 | 2X | | |
| TR 5 | | | 5 | 2X | 5 | 1X | | | | |

FIG. 22

DYNAMICALLY ADJUSTING STORAGE RESOURCES IN A VAST STORAGE NETWORK

CROSS REFERENCE TO RELATED PATENTS

The present U.S. Utility Patent application claims priority pursuant to 35 U.S.C. § 120 as a continuation of U.S. Utility application Ser. No. 16/807,076 entitled "STORING A CREDENTIAL IN A STORAGE NETWORK", filed Mar. 2, 2020, which is continuation of U.S. Utility application Ser. No. 16/201,486 entitled "AUTHENTICATING A CREDENTIAL IN A DISPERSED STORAGE NETWORK", filed Nov. 27, 2018, abandoned, which is continuation-in-part of U.S. Utility application Ser. No. 16/136,761 entitled "DETERMINING WHETHER TO COMPRESS A DATA SEGMENT IN A DISPERSED STORAGE NETWORK", filed Sep. 20, 2018, issued on Dec. 10, 2019 as U.S. Pat. No. 10,505,915, which is a continuation of U.S. Utility application Ser. No. 15/427,860 entitled "DETERMINING WHETHER TO COMPRESS A DATA SEGMENT IN A DISPERSED STORAGE NETWORK", filed Feb. 8, 2017, issued on Dec. 25, 2018 as U.S. Pat. No. 10,162,524, which is a continuation-in-part of U.S. Utility application Ser. No. 14/843,022 entitled "DETERMINING WHETHER TO COMPRESS A DATA SEGMENT INA DISPERSED STORAGE NETWORK", filed Sep. 2, 2015, issued on Mar. 21, 2017 as U.S. Pat. No. 9,602,496, which is a continuation of U.S. Utility application Ser. No. 14/148,198 entitled "AUTHENTICATING A DATA ACCESS REQUEST TO A DISPERSED STORAGE NETWORK", filed Jan. 6, 2014, issued on Sep. 22, 2015 as U.S. Pat. No. 9,143,499, which is a continuation of U.S. Utility application Ser. No. 13/180,675 entitled "AUTHENTICATING A DATA ACCESS REQUEST TO A DISPERSED STORAGE NETWORK", filed Jul. 12, 2011, issued on Jan. 7, 2014 as U.S. Pat. No. 8,627,114, which claims priority under 35 USC § 119(e) to U.S. Provisional Application No. 61/369,812, entitled "DISPERSED STORAGE NETWORK ACCESS REQUEST AUTHENTICATION" filed Aug. 2, 2010, expired, all of which are incorporated herein by reference in their entirety and made part of the present U.S. Utility Patent Application for all purposes.

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 7B is a flowchart illustrating an example of authenticating a data access request in accordance with the invention;

FIG. 7C is a flowchart illustrating an example of processing an authentication request in accordance with the invention;

FIG. 15D is a schematic block diagram of another embodiment of a pillar assignment of a dispersed storage network memory in accordance with the invention;

FIG. 16 is a flowchart illustrating an example of implementing a storage policy in accordance with the invention;

FIG. 17A is a schematic block diagram of another embodiment of a pillar assignment of a dispersed storage network memory in accordance with the invention;

FIG. 17B is a schematic block diagram of another embodiment of a pillar assignment of a dispersed storage network memory in accordance with the invention;

FIG. 17C is a schematic block diagram of another embodiment of a pillar assignment of a dispersed storage network memory in accordance with the invention;

FIG. 22 is a table illustrating an example of wireless configuration and pillar assignments in accordance with the invention;

DETAILED DESCRIPTION OF THE INVENTION

Figure 1:
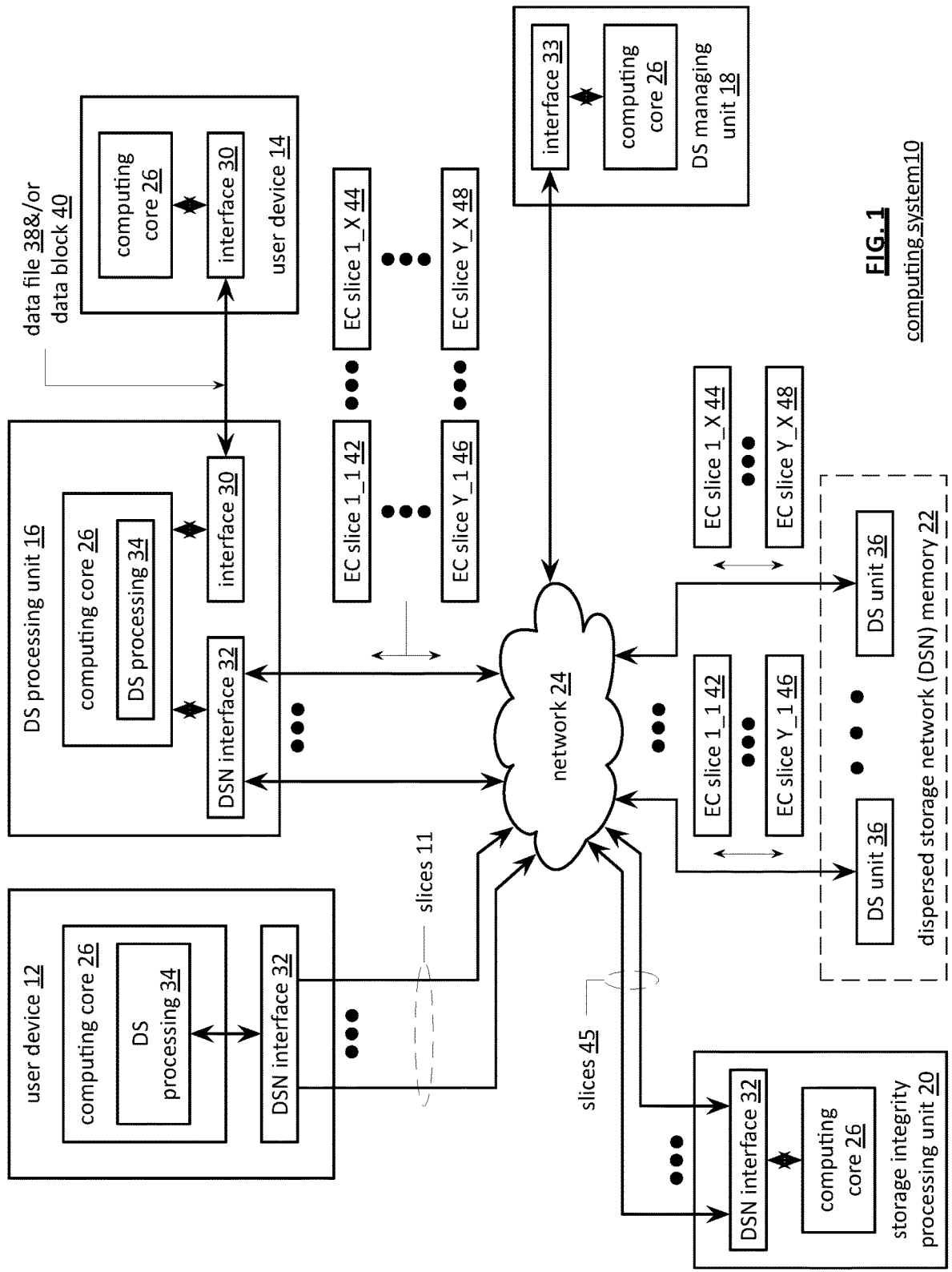
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-24.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it send the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., 21 to 2n bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improved data storage integrity and security. Further examples of encoding the data segments will be provided with reference to one or more of FIGS. 2-24.

Each DS unit 36 that receives a slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
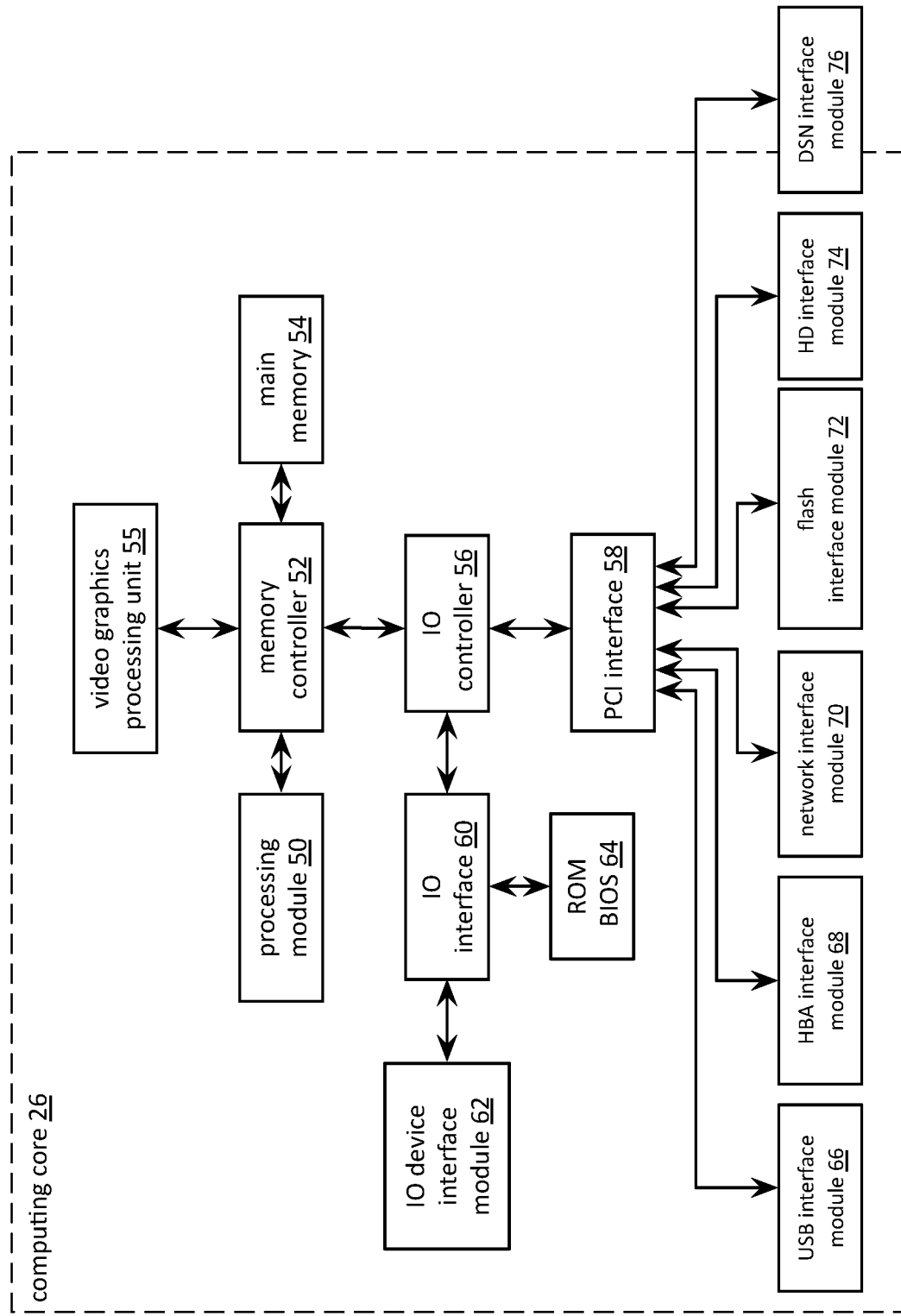
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-24.

Figure 3:
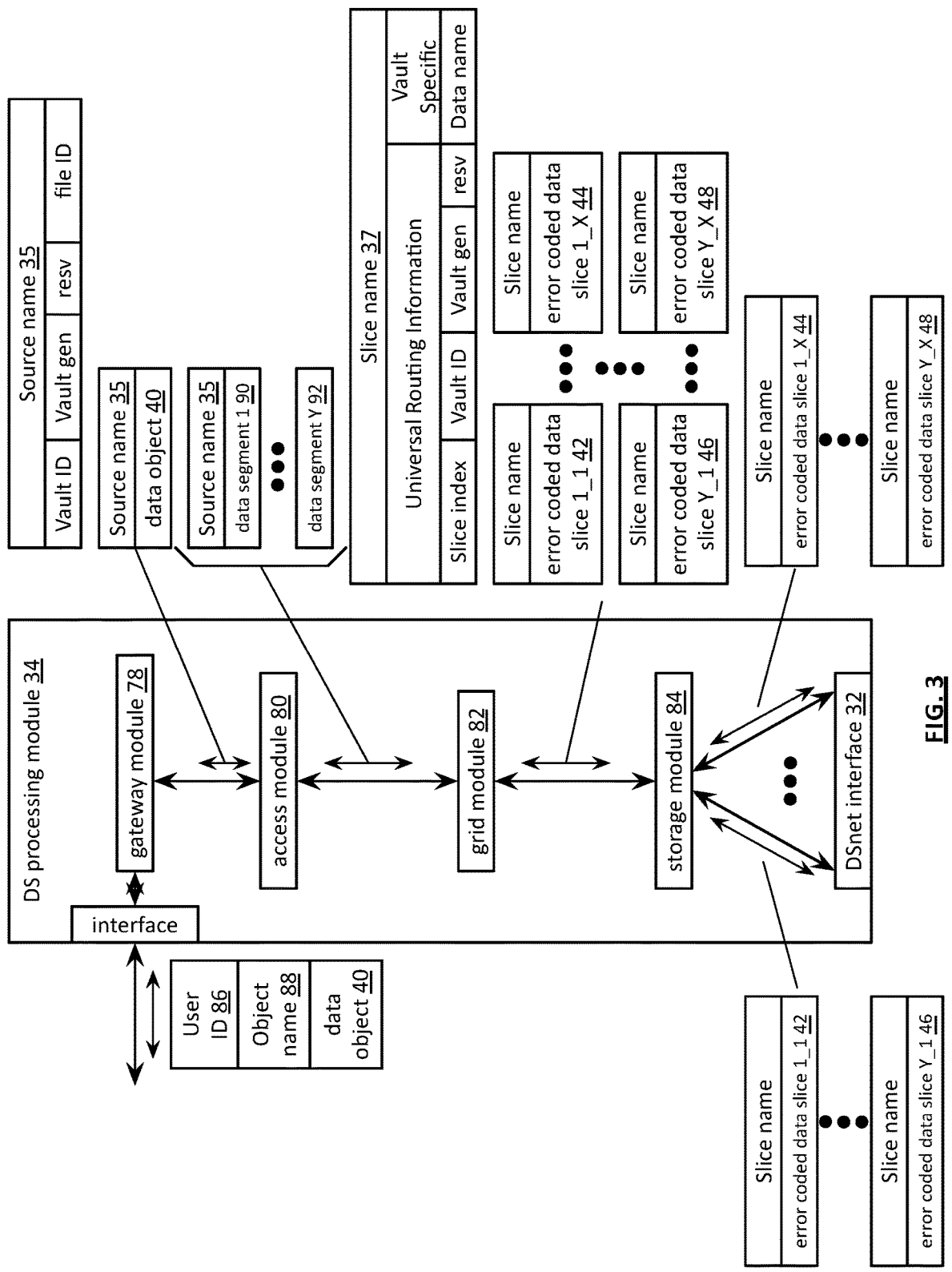
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user 12 or of the DS processing unit 14. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 60 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
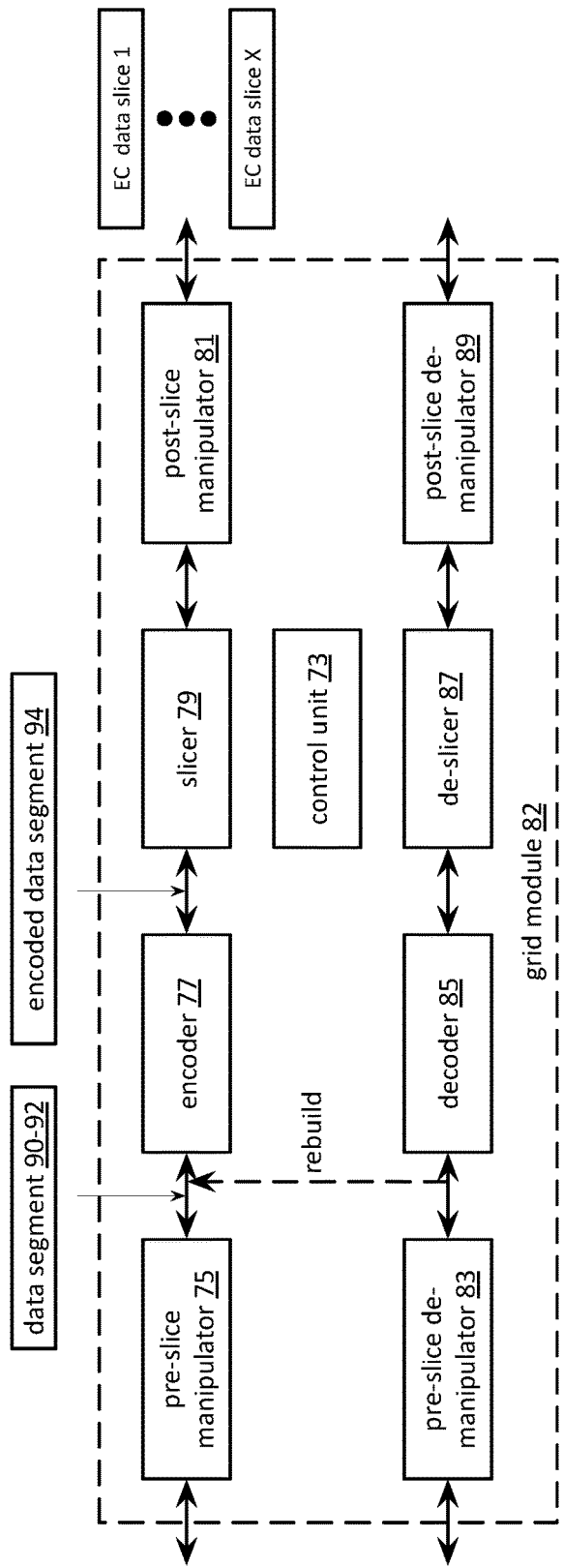
FIG. 4 is a schematic block diagram of an embodiment of a grid module in accordance with the invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

Figure 5:
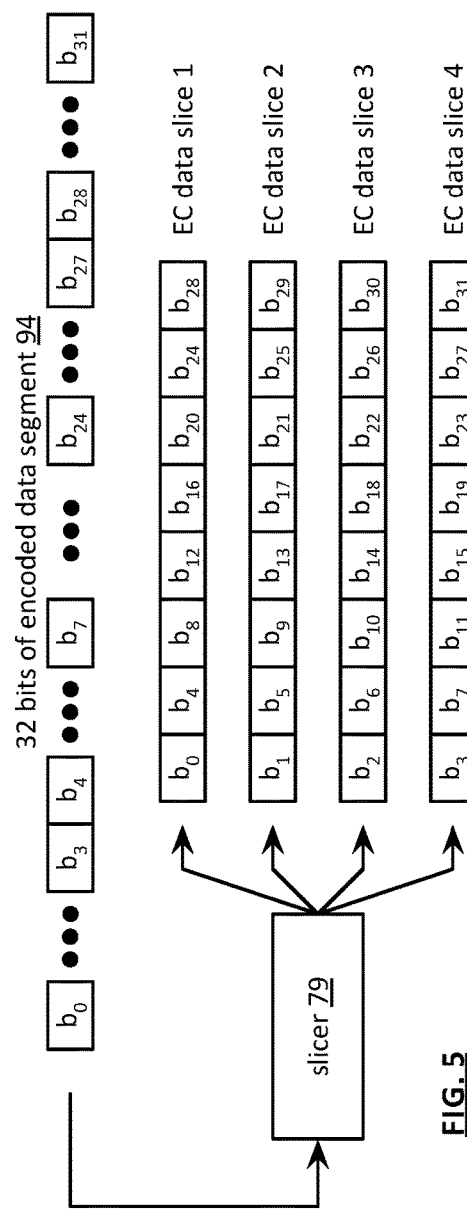
FIG. 5 is a diagram of an example embodiment of error coded data slice creation in accordance with the invention.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6A:
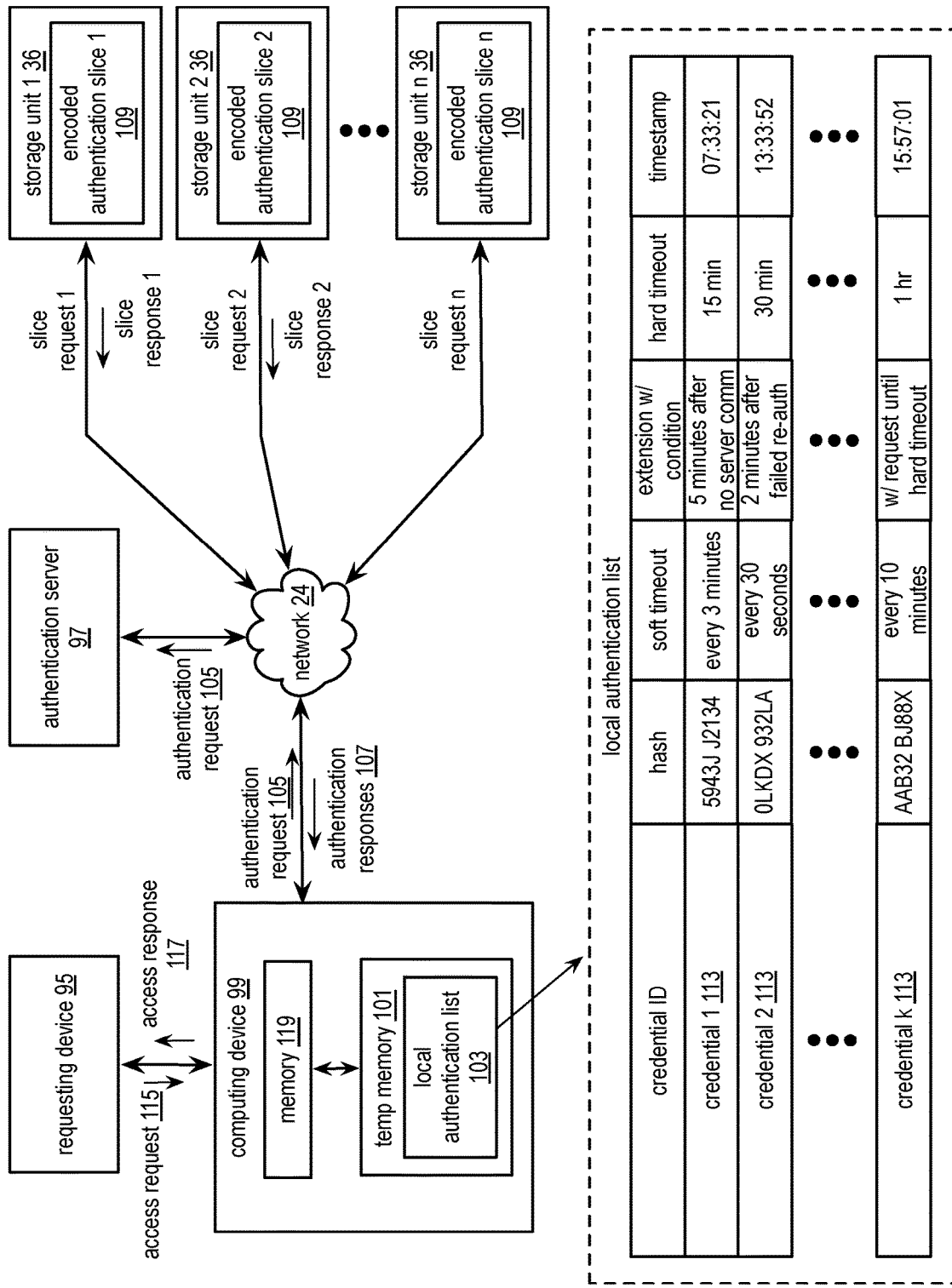
FIG. 6A is a schematic block diagram of another embodiment of a computing system in accordance with the invention.

FIG. 6A is a schematic block diagram of another embodiment of a computing system that includes a computing device 99, an authentication server 97, the network 24 of FIG. 1, and a set of storage units 36 of FIG. 1. In an example, the computing device is implemented by one of the user device 12-14, the DS processing unit 16, and the DS managing unit 18 of FIG. 1. The computing device 99 includes a temporary memory 101 (e.g., volatile) that stores a local authentication list 103 and a memory 119 (e.g., non-volatile).

The memory 119 may be one of a variety of non-volatile memory types (e.g., does not lose data when power is lost). For example, the memory 119 is one of a flash memory, a read only memory (ROM), a hard disk drive (HDD), a magnetic tape, an optical disc, 3D XPoint, etc.

The temporary memory 101 may be one of a variety of volatile memory types. For example, the temporary memory 101 is one of a random access memory (RAM), an erasable programmable read only memory (EPROM), a static RAM (SRAM), advanced RAM (ARAM), dynamic RAM (DRAM), etc. In one example, the temporary memory is a semi-volatile memory (e.g., has a limited non-volatile duration after power is removed). In this example, data (e.g. a credential) from the temporary memory is able to be stored in the memory 119 and/or in the set of storage units 36 before the data is lost.

The local authentication list includes one or more fields. For example, the fields include a credential identifier, a hash of the credential, a soft timeout, an extension of time when a condition is met, a hard timeout, and a timestamp. In one example, the credentials 113 includes authentication information (e.g., password, token, certificate, signature, fingerprint, etc.) of a user of a user device, an access request of the user device and/or the user device. In another example, a credential 113 is only stored as a hash in the local authentication list and/or as a set of encoded hash slices in the set of storage units. In this example, the hash is used to authenticate a credential 113 received with the access request 115.

In an example of an authentication process within a dispersed storage network, it is desirable to cache a credential and only authenticate it once within a short given amount (e.g., minutes) of time. Using this authentication process, the authentication server 97 is not deluged with a number of similar requests. The subsequent authentications are able to be checked against identical, recently authenticated credentials in the cache. Holding on to the credentials for a long period of time (e.g. 45 minutes, hours) is not desirable. For example, it is not desirable to hold on to the credentials when the credential changes. As another example, it is not desirable to hold on to the credentials when the credential is no longer valid (e.g., is expired).

Thus, in one example, the computing device utilizes a soft-timeout, where the credential is re-authenticated (e.g., as an authentication request 105) with the authentication server and utilizes a hard-timeout, after which the computing device will forget (e.g., delete) the credential, even when the authentication server is unavailable. The hard-timeout functions to prevent computing devices from storing credentials for an extended period of time (e.g., hours, days, years, etc.), thus expanding the opportunity for them to be compromised.

In one example, the credentials will timeout (e.g., after a first timeframe), and be rechecked (e.g., with the authentication server) after a short amount of time (e.g., 45 seconds, 3 minutes, 10 minutes, etc.). In another example, when the authentication server goes down (e.g., is unavailable, is offline, is not responding (e.g., with an authentication response 107) in a timeframe, etc.), it is beneficial to cache the credentials for a longer period of time, such that if the authentication server is not able to be contacted for re-authentication, the cached credentials would not expire immediately.

Instead, under certain conditions, the computing device is authorized to extend the period of a timeout (e.g., for a second timeframe). In one example, after the second timeframe, the credential is invalid and the computing device deletes the credential. As another example, after the second timeframe, the computing device is re-authorized (e.g., based on a condition, based on receiving authorization from the authentication server, etc.) to extend the period of time for which the credential is valid. This re-authorization resets the soft timeout and/or the hard timeout periods.

In an example of operation, the computing device 99 receives an access request 115 from a requesting device 95. The access request 115 includes a credential 113 of at least one of the requesting device or the access request. When the credential 113 matches (e.g., substantially matches) a stored credential 113 in the computing device or matches a credential validated through an authentication server 97, the access request 115 is authenticated. When the credential does not match the stored credential and/or is not authenticated by the authentication server 97, the access request 115 is denied. When the access request includes a credential that is not stored, but is validated by the authentication server, the computing device stores the credential in one or more of the temporary memory, the memory, or the set of storage units 36. The computing device then executes the access request 115 and returns an access response 117 to the requesting device 95.

As a specific example of the credential, a credential 1 113 includes a hash of "5943J J2134", a soft timeout of 3 minutes, an extension with condition of 5 minutes from a last recorded connection with an authentication server, a hard timeout of 15 minutes, and a timestamp of 07:33:21. The soft timeout indicates how often (e.g., a first time period) the computing device must contact the authentication server to re-validate the credential. For example, at times 07:36:21, 07:39:21, 07:42:21 and 07:45:21 the computing device must re-authenticate the credential for it to remain current (e.g., valid).

The extension with condition indicates that when the condition is met, a second period of time (e.g., after a soft timeout) is given for when the credential is valid to be used for subsequent authentications. The condition may be one or more of a communication with the authentication server is slower than a threshold, a failed re-authorization of the credential, the authentication server responding extending a period of use time, and the computing device receiving a command.

For example, when at 07:36:21, the authentication server is down (e.g., no communication with the computing device), the extension allows for the credential 1 113 to be valid for 5 more minutes (e.g., until 07:41:21), at which point unless a condition is again met, the credential is invalid and/or deleted. For example, the computing device is able to contact the authentication server at 07:39:21 and re-authenticates the credential until 07:42:21. The hard timeout indicates when the credential must be deleted and/or when the computing device and/or the set of storage units are no longer authorized to store the credential. For example, for credential 1 113, the hard timeout is at 07:48:21. Thus, after 07:48:21, the credential must be deleted, and/or it is no longer valid.

In one example, the soft timeout does not apply to the encoded authentication slices stored in the set of storage units (e.g., as a decode threshold number of the encoded authentication slices are needed to recover the credential and thus is more secure). In this example, the authentication server may send a lock message to the set of storage units such that a decode threshold number of encoded authentication slices are not visible (e.g., locked). In another example, the soft timeout is a first duration of time for the credential stored in the local authentication list and is a second duration of time for the set of encoded authenticated slices 1-n 109.

Figure 6B:
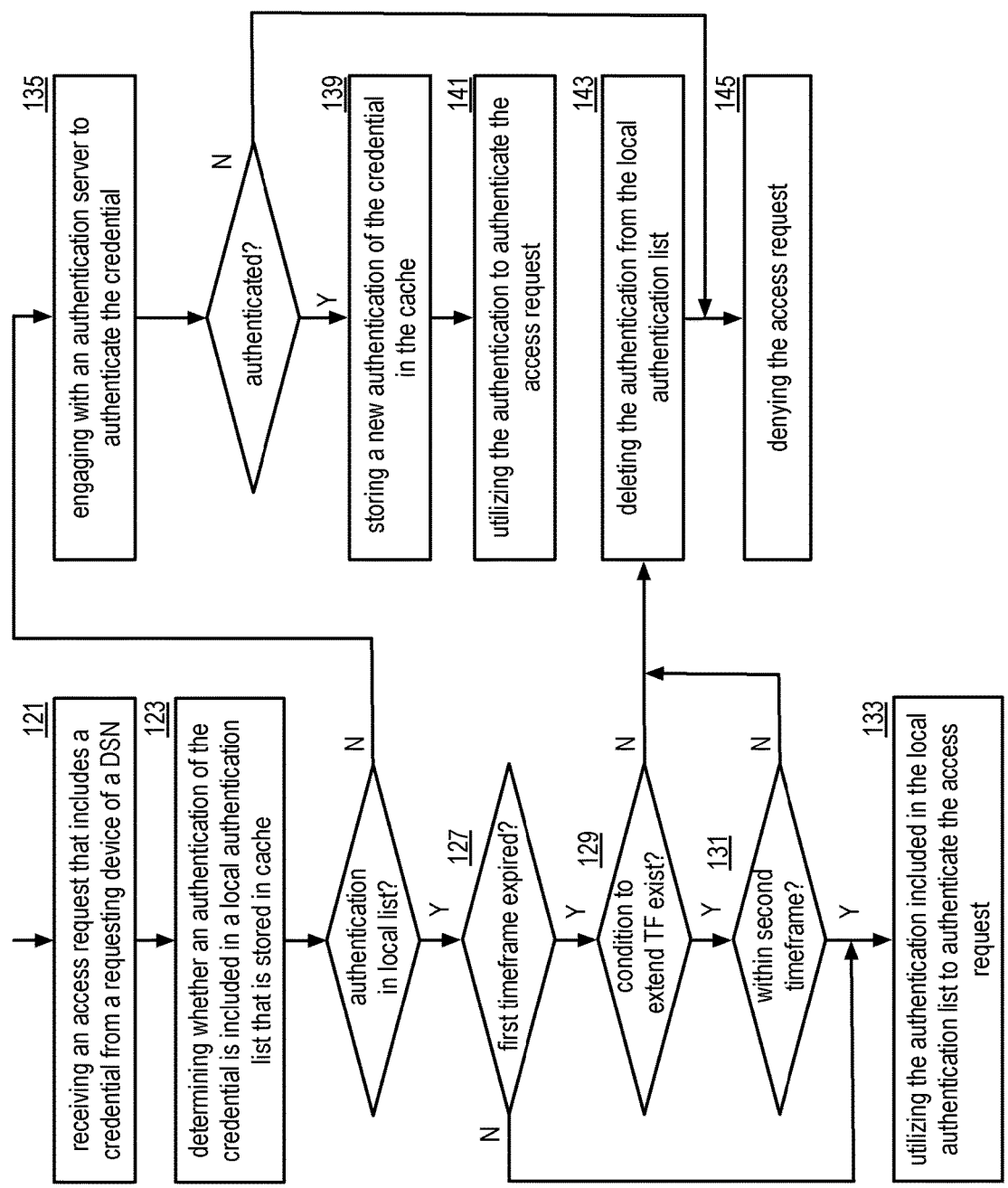
FIG. 6B is a flowchart illustrating an example of authenticating a credential in accordance with the invention.

FIG. 6B is a flowchart illustrating an example of authenticating a credential in a dispersed storage network (DSN). The method begins at step 121, where a computing device of the DSN receives an access request that includes a credential from a requesting device of the DSN. The method continues at step 123, where the computing device determines whether an authentication of the credential is included in a local authentication list. Note that during a first timeframe, the authentication is operative to authenticate the credential. In one example, the local authentication list is stored in a cache of the computing device. In another example, the local authentication list is dispersed storage error encoded into a set of encoded authentication slices and stored in a set of storage units of the DSN.

When the authentication of the credential is not included in the local authentication list, the method branches to step 135. When the authentication of the credential is included in the local authentication list, the method continues to step 127, where the computing device determines whether the first timeframe has expired based on a timestamp associated with the authentication, the first timeframe, and a current timestamp. When the first timeframe has not expired, the method branches to step 133, where the computing device utilizes the authentication included in the local authentication list to authenticate the access request. When the first timeframe has expired, the method continues at step 129, where the computing device determines whether a condition exists to extend a period of time for the authentication to be operative during a second time frame.

When the condition does not exist, the method branches to step 143. When the condition exists, the method continues to step 131, where the computing device determines whether the second time frame has expired based on the timestamp associated with the authentication, the first timeframe, the second timeframe, and/or a second current timestamp. When the second time frame has expired, the method branches to step 143.

When the second time frame has not expired, the method continues to step 133, where the computing device utilizes the authentication included in the local authentication list to authenticate the access request.

When the authentication of the credential is not included in the local authentication list, the method branches to step 135, where the computing device engages with an authentication server to authenticate the credential. When the credential is not authenticated, the method branches to step 145, where the computing device denies the access request. When the credential is authenticated, the method continues to step 139, where the computing device stores a new authentication of the credential in the cache. The method continues to step 141, where the computing device utilizes the authentication to authenticate the access request.

When the condition to extend a period of time does not exist or when the second time frame has expired, the method continues from step 129 or 131 to step 143, where the computing device deletes the authentication from the local authentication list. Having deleted the authentication, the method continues to step 145, where the computing device denies the access request.

Figure 6D:
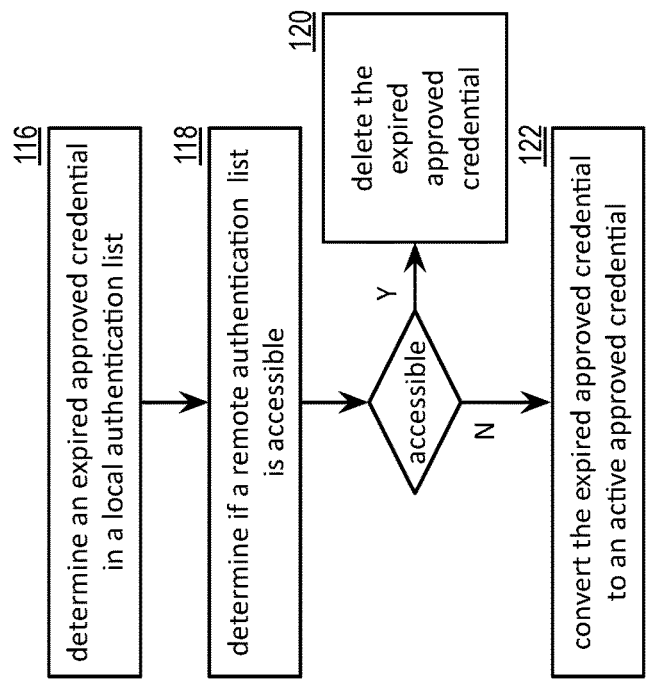
FIG. 6D is a flowchart illustrating an example of refreshing a local authentication list in accordance with the invention.
Figure 6C:
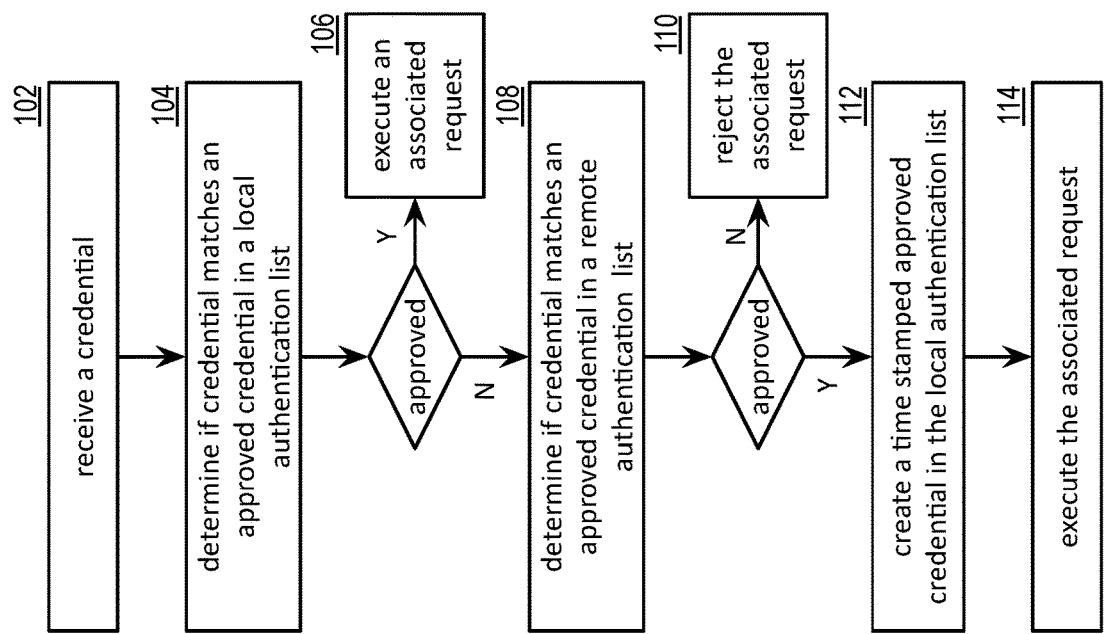
FIG. 6C is a flowchart illustrating an example of authenticating a request in accordance with the invention.

FIG. 6C is a flowchart illustrating an example of authenticating a request. The method begins with step 102 where a processing module (e.g., of a dispersed storage (DS) processing unit) receives a credential from a requester (e.g., a user device). The method continues at step 104 where the processing module determines whether the credential matches an approved credential from a local authentication list. The determination may be based on whether the credential matches an approved credential in the local authentication list and whether the credential in the local authentication list has not expired (e.g., from a time perspective). The local authentication list includes one or more previously approved credentials (e.g., received from an authentication authority) and an associated one or more timestamps such that a timestamp is paired with each approved credential.

The timestamp indicates at least one of how long the credential is approved and when the credential expires. For example, the processing module determines that the credential is approved when the credential matches at least one of the one or more previously approved credentials and the at least one of the one or more previously approved credentials has not expired. The method branches to step 108 when the processing module determines that the credential does not match the approved credential in the local authentication list. The method continues to step 106 when the processing module determines that the credential matches the approved credential in the local authentication list. The method continues at step 106 where the processing module executes an associated request.

The method continues at step 108 where the processing module determines whether the credential matches an approved credential in a remote authentication list (e.g., a list of the authentication authority). For example, the processing module sends an authentication request message to the authentication authority that includes the credential. The processing module receives an authentication response message that indicates whether the credential matches an approved credential in the remote authentication list. The processing module determines that the credential is approved when the authentication response message includes an indication that the credential matches an approved credential in the remote authentication list. The method branches to step 112 when the processing module determines that the credential matches the approved credential in the remote authentication list. The method continues to step 110 when the processing module determines that the credential does not match the approved credential and the remote authentication list. The method continues at step 110 where the processing module rejects the associated request when the processing module determines that the credential is not approved. For example, the processing module sends a reject message to the requester to reject the associated request. Alternatively, the processing module may execute the method as discussed in FIG. 6D when the processing module does not receive the authentication response message in a timely manner (e.g., unable to access the remote authentication list).

The method continues at step 112 where the processing module creates a time stamped approved credential in the local authentication list when the processing module determines that the credential matches the approved credential in the remote authentication list. For example, the processing module stores the credential and an associated expiration timestamp in the local authentication list. The method continues at step 114 where the processing module executes the associated request.

FIG. 6D is a flowchart illustrating an example of refreshing a local authentication list. The method begins with step 116 where a processing module (e.g., of a dispersed storage (DS) processing unit) identifies an expired approved credential in a local authentication list. The identification may be based on comparing an expiration timestamp associated with the approved credential to a current time. For example, the processing module determines that the approved credential is expired when the current time is greater than the expiration timestamp. The method continues at step 118 where the processing module determines whether a remote authentication list is accessible. The determination may be based on whether an authorization authority containing the remote authentication list is accessible (e.g., online).

For example, the processing module determines that the remote authentication list is accessible when the processing module receives an accessibility response message from the authorization authority in response to receiving an accessibility inquiry message from the processing module. The method branches to step 122 when the processing module determines that the remote authentication list is not accessible. The method continues to step 120 when the processing module determines that the remote authentication list is accessible. The method continues at step 120 where the processing module deletes the expired approved credential from the local authentication list. The method continues at step 122 where the processing module converts the expired approved credential to an active approved credential when the processing module determines that the remote authentication list is not accessible. For example, the processing module extends the expiration timestamp associated with the expired approved credential to convert the expired approved credential to an active approved credential. In an instance, the processing module extends the expiration timestamp by one day.

Figure 7A:
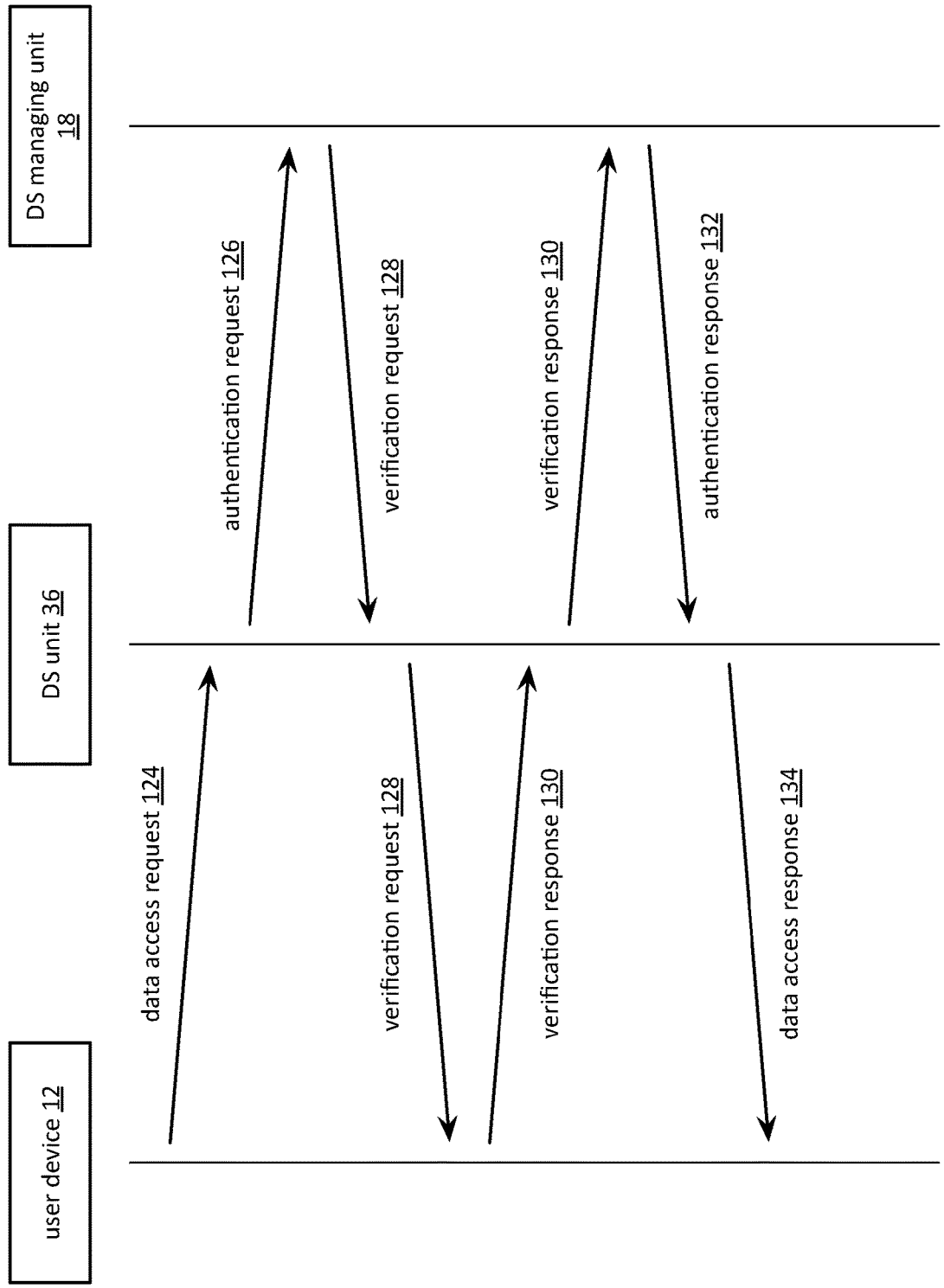
FIG. 7A is a diagram illustrating an example of an authentication sequence bounce diagram in accordance with the invention.

FIG. 7A is a diagram illustrating an example of an authentication sequence bounce diagram between a user device 12, a dispersed storage (DS) unit 36, and a DS managing unit 18. The sequence begins with a data accessing module (e.g., user device 12) of a dispersed storage network (DSN) sending a data access request 124 to a data storage module (e.g., DS unit 36, DS processing unit 16) of the DSN. Alternatively, or in addition to, the data accessing module sends a set of data access requests 124 to a set of data storage modules of the DSN. A data access request includes one or more of a read request, a write request, a list request, a delete request, and an edit request. The sequence continues where the data storage module identifies an authenticating module (e.g., DS managing unit 18) of the DSN for the data accessing module based on the data access request. For example, the data storage module extracts a user device identifier (ID) from the data access request and utilizes the user device ID in an authenticating module table lookup. The sequence continues where the data storage module sends an authentication request 126 to the authenticating module, wherein the authentication request 126 includes at least a portion of the data access request. For example, the authentication request includes the user device ID, a request type, and a data ID.

The sequence continues where the authenticating module outputs a verification request 128 destined for the data accessing module, wherein the verification request 128 includes a verification code that is generated based on the authentication request. A verification code may be unique for the data access request and user ID and may include one or more of a random number, a random string of characters, a nonce, a sequential number, and a number based on a table lookup. The outputting of the verification request by the authentication module includes sending the verification request to the data storage module and forwarding, by the data storage module, the verification request to the data accessing module.

The sequence continues where the data accessing module outputs a verification response 130 destined for the authenticating module, wherein the verification response 130 includes a modified verification code that is generated based on the verification code and a credential. The credential includes at least one of a locally stored password, a remotely retrieved stored password, a password from a user input, a key, and an authenticator. The generating of the modified verification code includes one or more of performing a verifying function (e.g., a deterministic function, a hashing function, encryption, other mathematical manipulation) on the verification code and the credential to produce the modified verification code; generating a second random string of characters; obtaining a certificate chain; generating a signature over the second random string of characters and the verification request; and obtaining a signature algorithm indicator. The signature is generated utilizing a private key associated with the data accessing module. The outputting of the verification response 130 by the data accessing module includes sending the verification response 130 to the data storage module and forwarding, by the data storage module, the verification response 130 to the authenticating module.

The sequence continues where the authenticating module outputs an authentication response 132 to the data storage module, wherein the authentication response 132 is generated based on the verification response 130. The generating of the authentication response 132 includes performing the verifying function on the verification code and a reference credential to produce a reference verification code, comparing the modified verification code with the reference verification code, and when the comparison is favorable, generating the authentication response 132 to indicate a favorable authentication. A reference credential includes a stored credential. Alternatively, the generating of the authentication response 132 includes verifying the signature of the verification response 130, utilizing a public key associated with the data accessing module, and when the verifying is favorable, generating the authentication response 132 to indicate a favorable authentication.

The sequence continues where the data storage module facilitates the data access request when the authentication response 132 is favorable. The facilitation may include outputting a data access response 134 to the data accessing module. For example, the data storage module outputs a data access response 134 that includes an encoded data slice that corresponds to a slice name when the data access request 124 includes a read request for the slice name. The method of operation of the data storage module and the authenticating module is discussed in greater detail of reference to FIGS. 7B and 7C.

FIG. 7B is a flowchart illustrating an example of authenticating a data access request. The method begins with step 136 where a processing module (e.g., of a storage module) receives a data access request from a data accessing module of a dispersed storage network (DSN). The method continues at step 138 where the processing module identifies an authenticating module for the data accessing module based on the data access request. The method continues at step 140 where the processing module sends an authentication request to the authenticating module of the DSN, wherein the authentication request includes at least a portion of the data access request. The method continues at step 142 where the processing module receives an authentication response from the authenticating module, wherein the authentication response is generated based on a verification response of the data accessing module. The method continues at step 144 with a processing module facilitates the data access request when the authentication response is favorable.

FIG. 7C is a flowchart illustrating an example of processing an authentication request. The method begins with step 146 where a processing module (e.g., of an authenticating module) receives an authentication request from a data storage module of a dispersed storage network (DSN), wherein the authentication request includes at least a portion of a data access request of a data accessing module of the DSN. The method continues at step 148 where the processing module outputs a verification request destined for the data accessing module, wherein the verification request includes a verification code that is generated based on the authentication request. The method continues at step 150 where the processing module receives a verification response, wherein the verification response includes a modified verification code that is generated by the data accessing module based on the verification code and a credential. The method continues at step 152 where the processing module outputs an authentication response that is generated based on the verification response, wherein, the data access request is authenticated when the authentication response is favorable. The generating the authentication response includes performing a verifying function on the verification code and a reference credential to produce a reference verification code, comparing the modified verification code with the reference verification code, and when the comparison is favorable, generating the authentication response to indicate a favorable authentication.

Figure 8B:
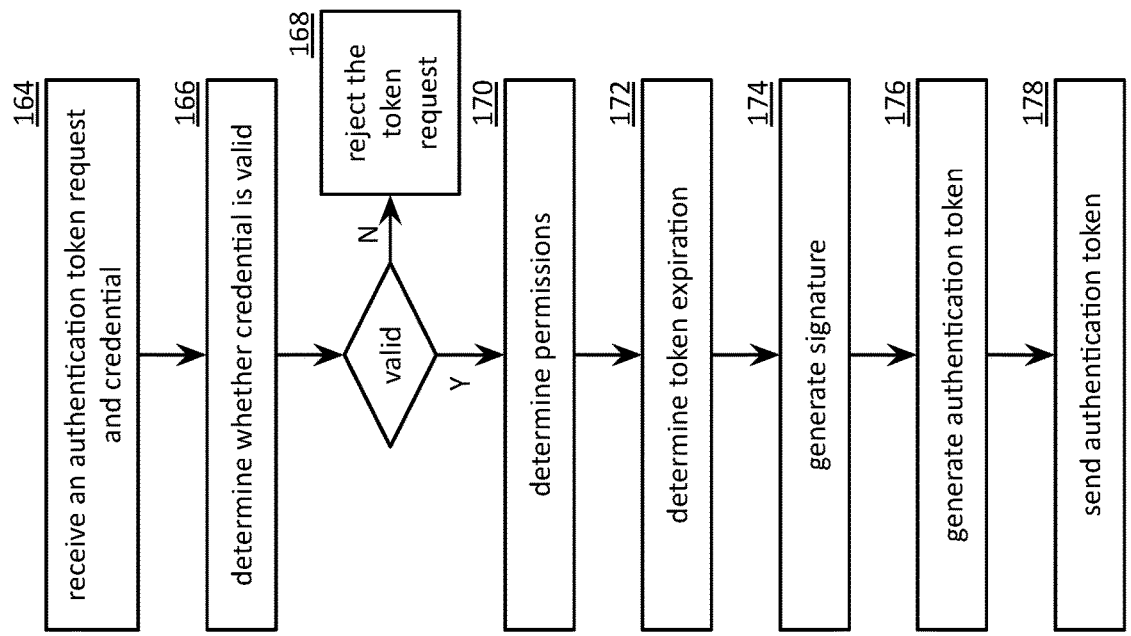
FIG. 8B is a flowchart illustrating an example of processing an authentication token request in accordance with the invention.
Figure 8A:
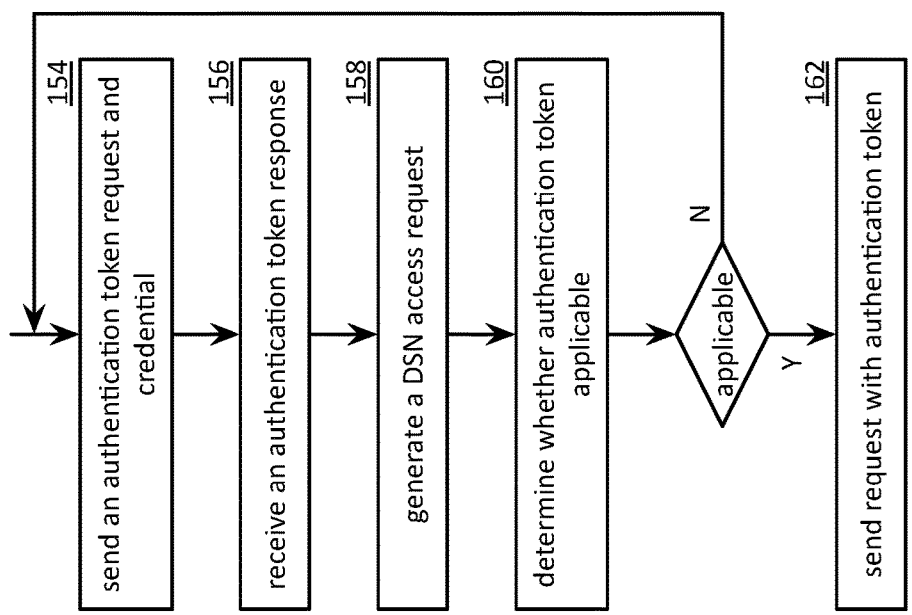
FIG. 8A is a flowchart illustrating an example of acquiring an authentication token in accordance with the invention.

FIG. 8A is a flowchart illustrating an example of acquiring an authentication token. The method begins at step 154 where a processing module (e.g., a user device) generates and sends an authentication token request message that includes a credential. The credential includes one or more of a user device identifier (ID), a password, a hash of the password, and a signature. For example, the processing module of a user device sends the request to an authentication authority (e.g., a DS managing unit). The authentication authority receives the authentication token request message and generates an authentication token response message in response. The method of operation of the authentication authority is discussed in greater detail with reference to FIG. 8B. The method continues at step 156 where the processing module receives the authentication token response message. The authentication token response message includes an authentication token, wherein the token includes one or more of a permission, a timestamp associated with the permission, and a signature signed by the authentication authority.

The method continues at step 158 where the processing module generates a dispersed storage network (DSN) access request. The generation may be based on one or more of a user input, an application output, a read sequence, a write sequence, an access requirement, and a transfer requirement. For example, the processing module executes a storage sequence of a data object by generating a write request as the DSN access request. The method continues at step 160 where the processing module determines whether the authentication token is applicable to the request. The processing module determines that the authentication token is applicable to the request when the request is allowable based on permissions associated with the authentication token. For example, the processing module determines that the authentication token is applicable to the request when the request is a write request and a permission allows the processing module to perform an associated write sequence (e.g., for a particular vault). The method repeats back to step 154 when the processing module determines that the authentication token is not applicable. The method continues to step 162 when the processing module determines that the authentication token is applicable.

The method continues at step 162 where the processing module sends a request message that includes the DSN access request and the authentication token. For example, the processing module sends the request message to a dispersed storage (DS) unit to write an encoded data slice to the DS unit. The method of operation to process the request message is discussed in greater detail with reference to FIG. 9.

FIG. 8B is a flowchart illustrating an example of processing an authentication token request. The method begins with step 164 where a processing module (e.g., of an authentication authority) receives an authentication token request message that includes a credential. For example, the processing module receives the authentication token request from a user device. The method continues at step 166 where the processing module verifies the credential (e.g., comparing a decrypted signature to a hash of the request message).

At step 166, the processing module determines whether the credential is valid based on comparing an element of the credential to a stored representation of the credential. For example the processing module determines that the credential is valid when a comparison of a password of the credential to a stored password associated with an identification of a user device indicates that the password and the stored password are substantially the same. The method branches to step 170 when the processing module determines that the credential is valid. The processing module continues to step 168 when the processing module determines that the credential is not valid. The method continues at step 168 where the processing module rejects the authentication token request when the processing module determines that the credential is not valid. For example, the processing module rejects the authentication token request by sending an authentication token reject response message to the user device.

The method continues at step 170 where the processing module determines permissions based on one or more of information contained in the authentication token request message, a query, a lookup, predetermination, a message, and a command. For example, the processing module determines the permissions by a lookup into a permissions table associated with a user device identifier (ID) included in the authentication token request message. The method continues at step 172 where the processing module determines a token expiration. The determination may be based on one or more of a requester identification, a predetermined time, a time associated with the requester identification, a request type, a message, and a command. The method continues at step 174 where the processing module generates a signature for the authentication token. For example, the processing module generates an encrypted hash of the permissions and token expiration (and any other elements of the authentication token) utilizing a private key associated with the processing module. The method continues at step 176 where the processing module generates an authentication token by aggregating the permissions, the token expiration, and the signature. The method continues at step 178 where the processing module sends the authentication token (e.g., to the user device).

Figure 9:
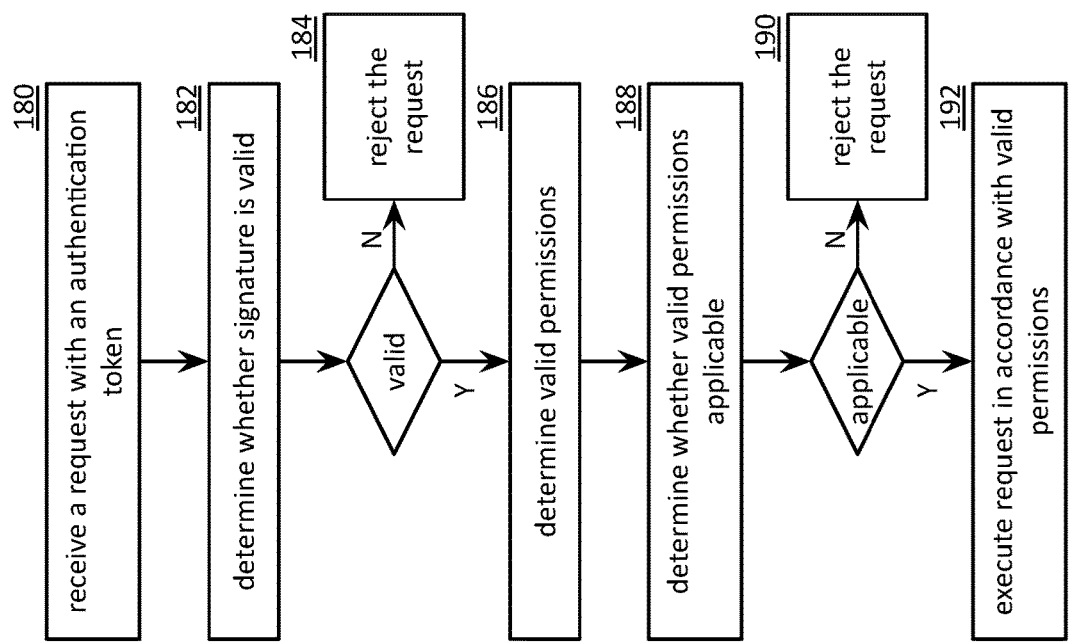
FIG. 9 is a flowchart illustrating an example of processing a request in accordance with the invention.

FIG. 9 is a flowchart illustrating an example of processing a request message. The method begins with step 180 where a processing module (e.g., of a dispersed storage (DS) unit) receives a request message that includes an authentication token. The method continues at step 182 where the processing module determines whether a signature associated with the authentication token is valid (e.g., indicating valid when a comparison of a decrypted signature to a hash of the authentication token indicates that they are substantially the same). The method branches to step 186 when the processing module determines that the signature is valid. The method continues to step 184 when the processing module determines that the signature is not valid. The method continues at step 184 where the processing module rejects the request message when the processing module determines that the signature is not valid. For example, the processing module sends a reject response message to a requester associated with the request.

The method continues at step 186 where the processing module determines valid permissions based on permissions included in the authentication token. The method continues at step 188 where the processing module determines whether the valid permissions are applicable to the request. For example, the processing module determines that the valid permissions are applicable when the valid permissions substantially encompasses the request. For instance, the processing module determines that the valid permissions are applicable when the valid permissions allow a read request to access vault 100 for a user device identifier (ID) 356 and the request is from user device ID 356 to read data from vault 100.

The method branches to step 192 when the processing module determines that the valid permissions are applicable. The method continues to step 190 when the processing module determines that the valid permissions are not applicable. The method continues at step 190 where the processing module rejects the request message when the processing module determines that the valid permissions are not applicable. For example, the processing module sends the reject response message to the requester and a DS managing unit. The method continues at step 192 where the processing module executes a request of the request message in accordance with the valid permissions when the processing module determines that the valid permissions are applicable. For example, the processing module accesses vault 100 for device ID 356.

Figure 10:
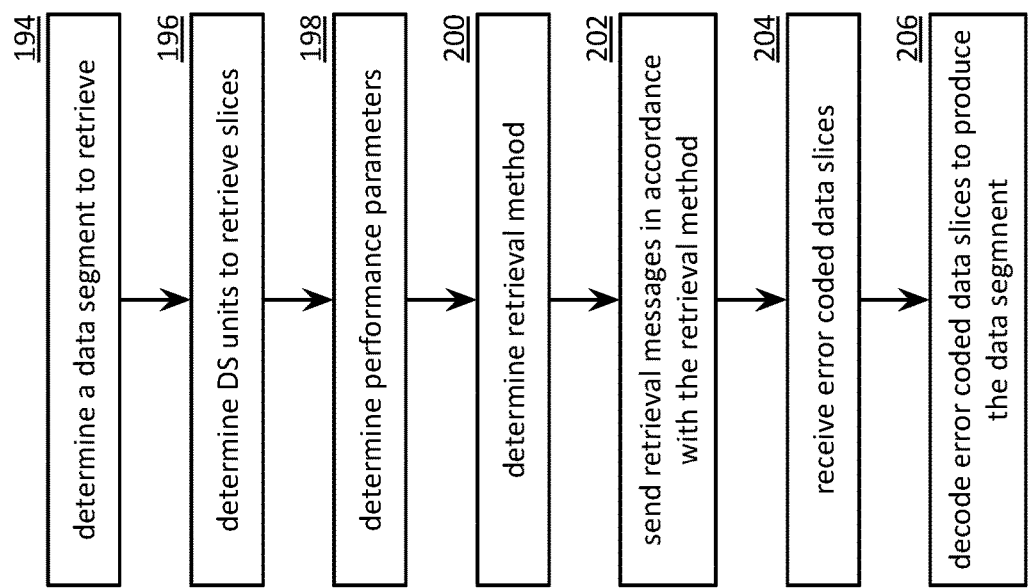
FIG. 10 is a flowchart illustrating an example of retrieving error coded data slices in accordance with the invention.

FIG. 10 is a flowchart illustrating an example of retrieving error coded data slices. The method begins with step 194 where a processing module (e.g., of a dispersed storage (DS) processing module) determines a data segment to retrieve. The determination may be based on one or more of an access request, a data object name, a source name, a data segment identifier, a list, a query, a message, and a command. For example, the processing module receives a data object retrieval request message and determines the data segment to retrieve based on converting a data object name of the data object into a source name of the data object. The method continues at step 196 where the processing module determines DS units to retrieve slices based on one or more of the data segment identifier, the source name, a slice name, and a virtual dispersed storage network (DSN) address to physical location table lookup.

The method continues at step 198 where the processing module determines performance parameters. The performance parameters may include one or more of input port bandwidth limitations, link speeds, a current average input port loading, DS unit performance history, a number of DS units, error coding dispersal storage function parameters, and retrieval sequences in progress. For example, the processing module determines the performance parameters to include a 100 Mb per second input port bandwidth limitation and a current average input port loading of 60 Mb per second.

The method continues at step 200 where the processing module determines a retrieval method based on one or more of the performance parameters, a performance threshold, a number of DS units, a priority indicator, a performance indicator, a security indicator, a command, and a message. The retrieval method includes sequencing the sending of retrieval messages to the DS units in a timed pattern such that the average input port loading is less than the input port bandwidth limitation. For example, processing module spaces the retrievals in time to avoid exceeding an input port bandwidth limitation.

The method continues at step 202 where the processing module sends retrieval messages in accordance with the retrieval method. The processing module may change the retrieval method based on updated performance parameters during the sending of the retrieval messages. The method continues at step 204 where the processing module receives error coded data slices from the DS units. The processing module may update the performance parameters based on performance of receiving of the error coded data slices. The method continues at step 206 where the processing module decodes the error coded data slices in accordance with an error coding dispersal storage function to produce the data segment.

Figure 11:
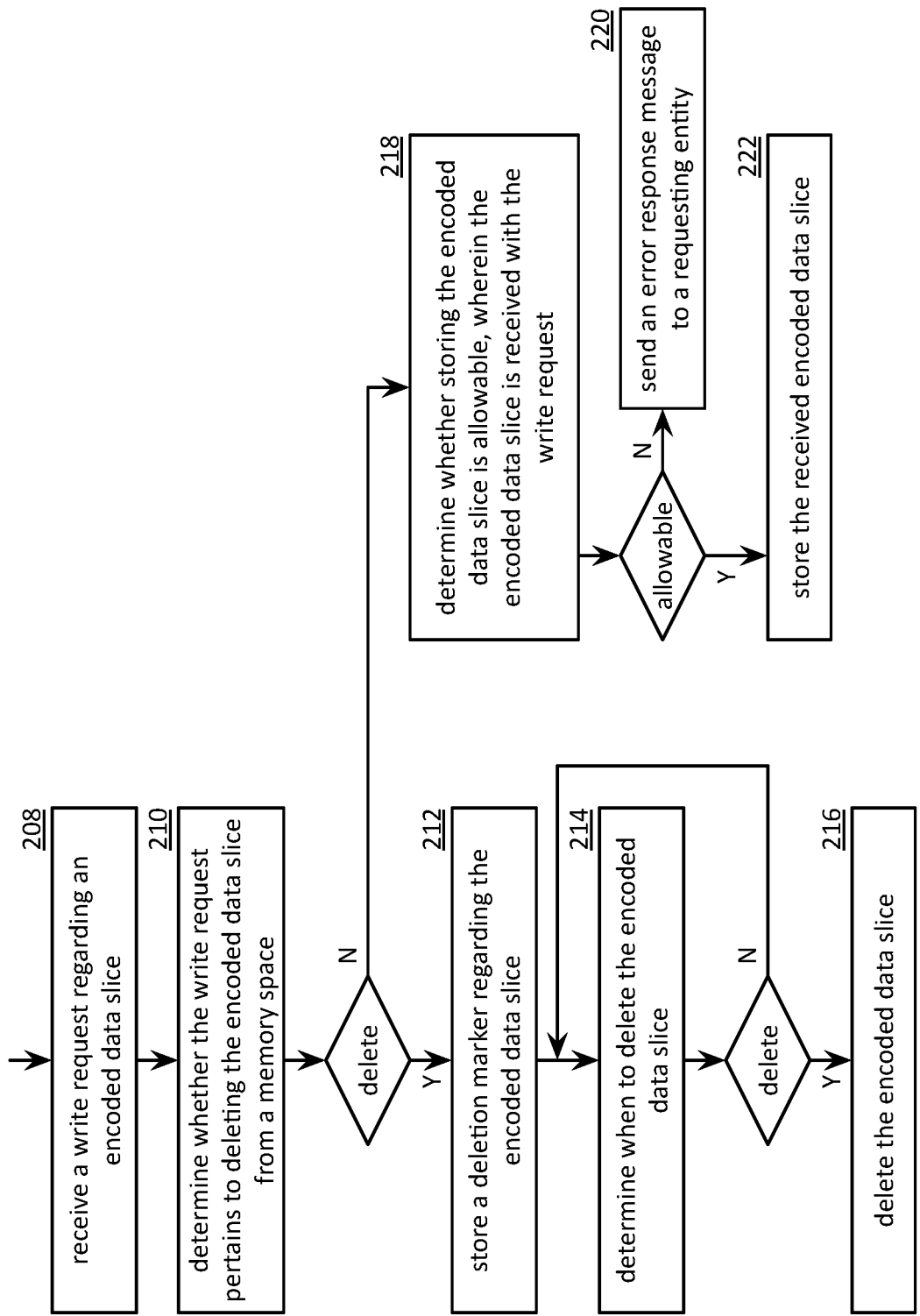
FIG. 11 is a flowchart illustrating an example of processing a write request in accordance with the invention.

FIG. 11 is a flowchart illustrating an example of processing a write request. The method begins with step 208 where a processing module (e.g., of a dispersed storage (DS) unit) receives a write request regarding an encoded data slice. The write request includes one or more of a write request opcode, a slice name, an encoded data slice, and a slice length. The method continues at step 210 where the processing module determines whether the write request pertains to deleting the encoded data slice from a memory space (e.g., a memory space of a memory associated with the processing module). The determining whether the write request pertains to deleting the encoded data slice includes interpreting the slice length field of the write request, indicating that the write request pertains to deleting the encoded data slice when the slice length field includes a first value, and indicating that the write request does not pertain to deleting the encoded data slice when the slice length field includes a second value. Such a value includes at least one of a number, a delete flag, and a delete code. For example, a first value includes a number zero and a second value includes a non-zero number. The method branches to step 218 when the processing module determines that the write request does not pertain to deleting the encoded data slice. The method continues to step 212 when the processing module determines that the write request pertains to deleting the encoded data slice.

The method continues at step 212 where the processing module stores a deletion marker regarding the encoded data slice when the write request pertains to deleting the encoded data slice. For example, the processing module stores the deletion marker in a local directory. The method continues at step 214 where the processing module determines when to delete the encoded data slice based on the deletion marker and in accordance with a deletion scheme. The determining when to delete the encoded data slice includes at least one of deleting the encoded data slice when memory availability compares unfavorably to a memory availability threshold, deleting the encoded data slice when a predetermined period of time has expired after receiving the write request, deleting the encoded data slice when utilization of the memory space compares unfavorably to a memory space usage threshold, and deleting the encoded data slice based on a deletion instruction of the write request (e.g., receiving an instruction to immediately delete).

The memory availability includes a number of available bytes of a memory associated with the processing module (e.g., of a DS unit). For example, the processing module determines that memory availability compares unfavorably to the memory availability threshold when memory availability is less than the memory availability threshold. The utilization of the memory space includes a number of utilized bytes of a memory associated with one of the processing module (e.g., of a DS unit) and a vault (e.g., associated with one or more user devices such as a vault). For example, the processing module determines that utilization of the memory space compares unfavorably to the memory space usage threshold when utilization of the memory space is greater than the memory space usage threshold. The method loops back to step 214 when the processing module determines not to delete the encoded data slice. The method continues to step 216 one the processing module determines to delete the encoded data slice. The method continues at step 216 where the processing module deletes the encoded data slice. For example, the processing module deletes the encoded data slice from the memory and deletes the deletion marker from the local directory.

The method continues at step 218 where the processing module determines whether storing the encoded data slice is allowable when the write request does not pertain to deleting the encoded data slice, wherein the encoded data slice is received with the write request. The determining whether the storing the encoded data slice is allowable includes at least one of indicating that storing the received encoded data slice is allowable when the received encoded data slice is associated with a directory file (e.g., based on a flag, a query, directory information associated with the write request, matching a slice name, a message, and a command), indicating that storing the received encoded data slice is allowable when memory availability compares favorably to a memory availability threshold, and indicating that storing the received encoded data slice is allowable when utilization of the memory space compares favorably to a memory space usage threshold. The method branches to step 222 when the processing module determines that storing the encoded data slice is allowable. The method continues to step 220 when the processing module determines that storing the encoded data slice is not allowable. The method continues at step 220 where the processing module sends an error response message to a requesting entity when the storing is not allowable. The method continues at step 222 where the processing module stores the received encoded data slice when the storing is allowable.

Figure 12:
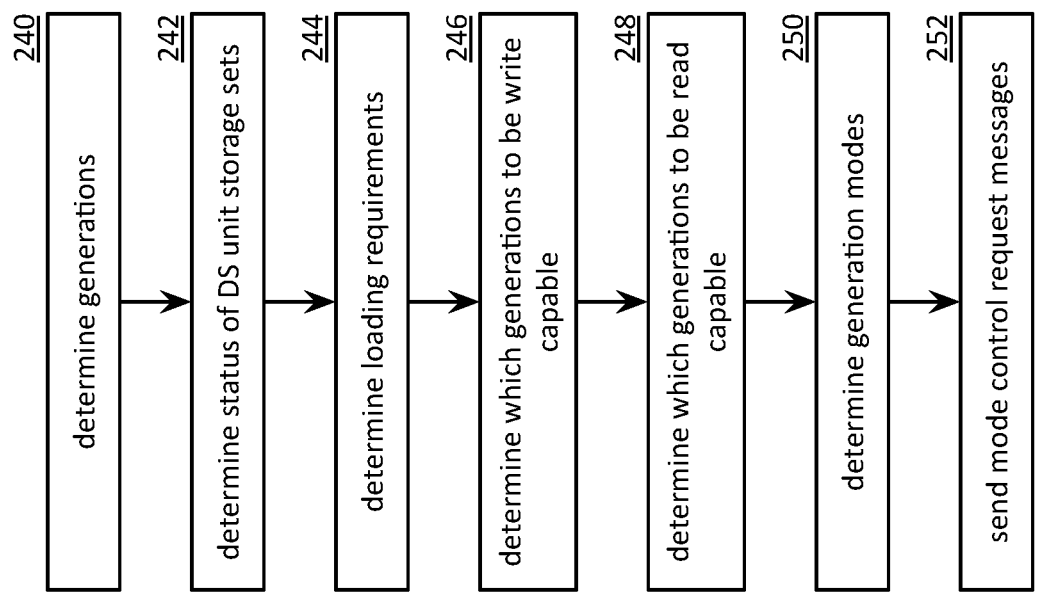
FIG. 12 is a flowchart illustrating an example of determining storage generation operational modes in accordance with the invention.

FIG. 12 is a flowchart illustrating an example of determining storage generation operational modes. The method begins with step 240 where a processing module (e.g., of a dispersed storage (DS) processing module) determines generations based on one or more of a generation list, which generation the process left off with last time, an error message, a vault identifier, a message, and a command. The method continues at step 242 where the processing module determines a status of DS unit storage sets associated with the generations, wherein the DS unit storage set determinations are based on one or more of a lookup, a query, a list, a message, and a command. The status may include one or more of a ping time, a write speed indicator, a read speed indicator, an availability history, a reliability history, cost, power availability, and utilization. The method continues at step 244 where the processing module determines loading requirements. The loading requirements include at least one of read operations per unit of time and write operations per unit of time. The determination may be based on one or more of a read history record, a write history record, a number of readers predictor, a number of writers predictor, a read activity predictor, and a write activity predictor. For example, the processing module determines the loading requirements to include 15,000 read operations per minute and 1,000 write operations per minute based on aggregating the historical and predictive records.

The method continues at step 246 where the processing module determines which generations to be write capable based on one or more of a status of the DS unit storage sets, the loading requirements, system preferences, a message, and a command. For example, the processing module determines DS unit storage set 500 to be write capable when the status of DS unit storage set 500 indicates that memory utilization is less than a utilization threshold. As another example, the processing module determines DS unit storage sets 430, 395, and 632 to be write capable when the loading requirements indicates a number of predicted writers is greater than a number of writers threshold. In such an instance, a system performance improvement is realized by activating multiple DS unit storage sets to process write sequence activity from many writers.

The method continues at step 248 where the processing module determines which generations to be read capable based on one or more of the status of the DS unit storage sets, the loading requirements, system preferences, a message, and a command. For example, the processing module determines DS unit storage set 700 to be read capable when the status of DS unit storage set 600 indicates that memory utilization is near a utilization threshold. As another example, the processing module determines DS unit storage sets 111, 327, and 948 to be read capable when the loading requirements indicates a number of predicted readers is greater than a number of readers threshold. In such an instance, a system performance improvement is realized by activating multiple DS unit storage sets to process read sequence activity from many readers.

The method continues at step 250 where the processing module determines generation modes. The generations modes includes one or more of DS unit power off, DS unit power on, DS unit memory spin down, DS unit memory spin up, DS unit off-line, and DS unit online. Such a determination may be based on one or more of which generations are write capable, which generations are read capable, status of the DS unit storage sets, loading requirements, system preferences, a message, and a command. For example, the processing module determines the generation mode for DS unit storage set 948 to be DS unit memory spin down when loading requirements indicates that system performance is satisfactory without utilizing DS unit storage set 948. The method continues at step 252 where the processing module sends mode control request messages to the DS unit storage sets in accordance with the generation modes.

Figure 13:
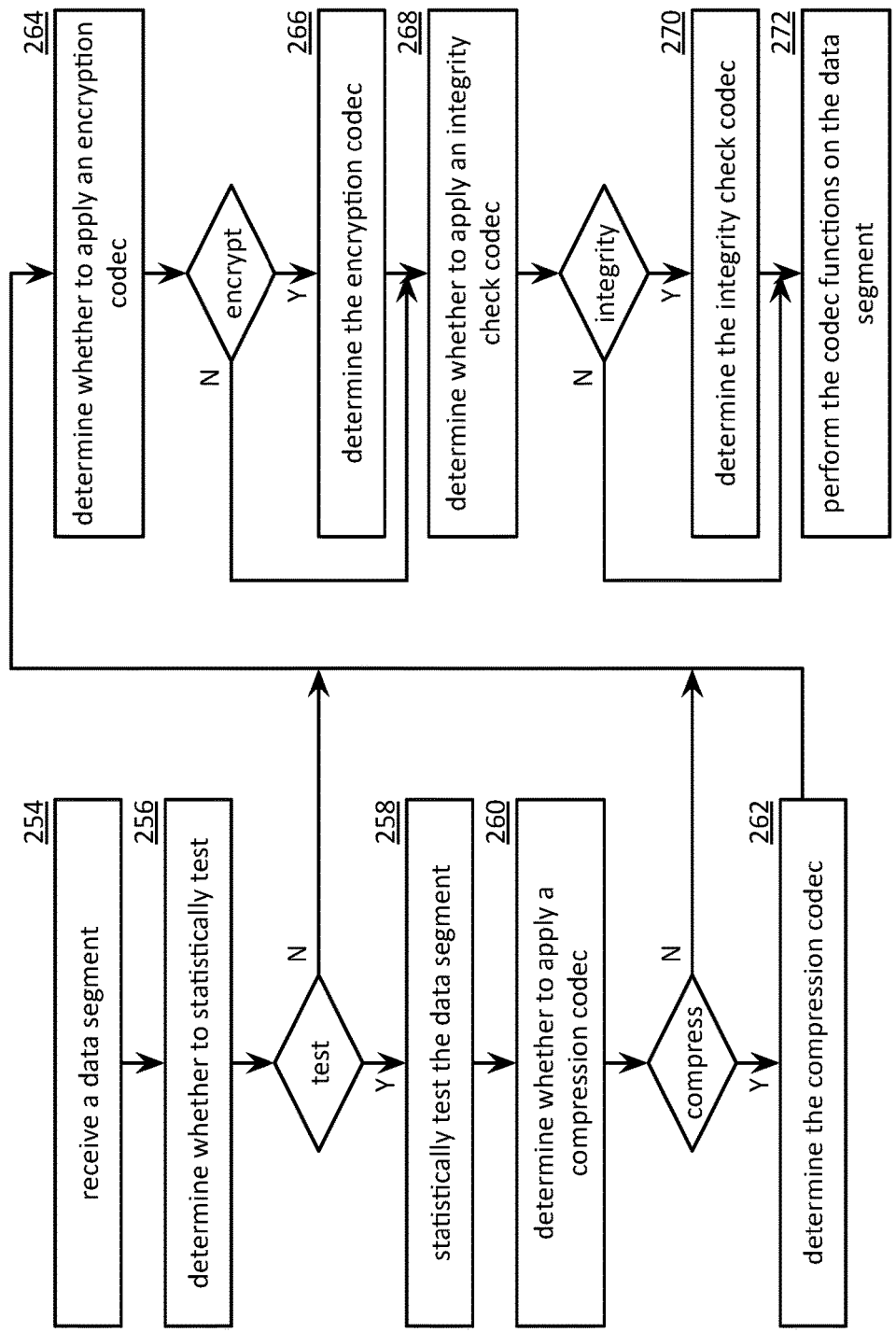
FIG. 13 is a flowchart illustrating an example of manipulating pre-slice data in accordance with the invention.

FIG. 13 is a flowchart illustrating an example of manipulating pre-slice data. The method begins with step 254 where a processing module (e.g., of a dispersed storage (DS) processing unit) receives a data segment. For example, a processing module receives the data segment with metadata associated with the data segment. The metadata may include one or more of a data object name, a data object type, magic values, header information, data object content attributes, data object size, a user identifier (ID), a priority indicator, a security indicator, an integrity check indicator, an encryption indicator, a compression indicator, and a performance indicator. The method continues at step 256 where the processing module determines whether to statistically test the data segment. The determination may be based on the metadata. For example, the processing module determines to not statistically test the data segment when the metadata indicates that a file name extension is associated with a data object type that is already compressed. The method branches to step 264 when the processing module determines to not statistically test the data segment. The method continues to step 258 when the processing module determines to statistically test the data segment.

The method continues at step 258 where the processing module statistically tests the data segment to determine compressibility. For example, the processing module compresses a portion of the data segment and compares a resulting compressed portion to the portion to determine if the difference is more than a compressibility threshold. The method continues at step 260 where the processing module determines whether to apply a compression codec based on the statistical test. For example, the processing module determines to not apply the compression codec when the statistical test indicates that the difference between the compressed portion and a portion is less than the compressibility threshold. The method branches to step 264 when the processing module determines to not apply the compression codec. The method continues to step 262 when the processing module determines to apply the compression codec. The method continues at step 262 where the processing module determines the compression codec when the processing module determines to apply the compression codec. The determination may be based on one or more of the statistical test (e.g., compressibility), a compression codec table lookup, a compression codec matching algorithm, a message, and a command.

The method continues at step 264 where the processing module determines whether to apply an encryption codec based on determining whether the data segment is already encrypted. For example, the processing module analyzes the data segment to determine a randomness factor and compares the randomness factor to a randomness threshold. Next, the processing module indicates to apply the encryption codec when the comparison indicates that the randomness factor is greater than the randomness threshold. As another example, the processing module determines that the data segment is encrypted based on the security indicator and/or encryption indicator of the metadata. The method branches to step 268 when the processing module determines to not apply the encryption codec. The method continues to step 266 when the processing module determines to apply the encryption codec. The method continues at step 266 where the processing module determines the encryption codec when the processing module determines to apply the encryption codec. The determination may be based on one or more of the randomness factor, the security indicator, the encryption indicator, an encryption codec table lookup, an encryption codec matching algorithm, a message, and a command.

The method continues at step 268 where the processing module determines whether to apply an integrity check codec based on determining whether an integrity check has already been applied to the data segment. For example, the processing module analyzes the data segments to determine if one or more of a signature, a hash, a checksum have been applied. As another example, the processing module determines that the integrity check has already been applied to the data segment based on the integrity check indicator of the metadata. The method branches to step 272 when the processing module determines to not apply the integrity check codec. The method continues to step 270 when the processing module determines to apply the integrity check codec. The method continues to step 270 where the processing module determines the integrity check codec when the processing module determines to apply the integrity check codec. The determination may be based on one or more of the integrity check determination, the integrity check indicator, an integrity check codec table lookup, an integrity check codec matching algorithm, a message, and a command.

The method continues at step 272 where the processing module performs the codec functions on the data segment in accordance with the compression codec, the encryption codec, and the integrity check codec as previously determined. For example, the processing module applies all three codec types to the data segment when all three codec types are desired. As another example, the processing module applies none of the three codec types to the data segment when none of the codec types are desired. As yet another example, the processing module applies one codec type but not the other two codec types. In addition, the processing module may update a codec stack to indicate the ordering of the codec functions as applied to the data segment to enable subsequent post-slice data de-manipulation in the reverse order. The method may continue to apply more codecs to the data segment in the same or more categories. For example, the processing module may apply the compression codec, the encryption codec, a second encryption codec and the integrity check codec.

Figure 14:
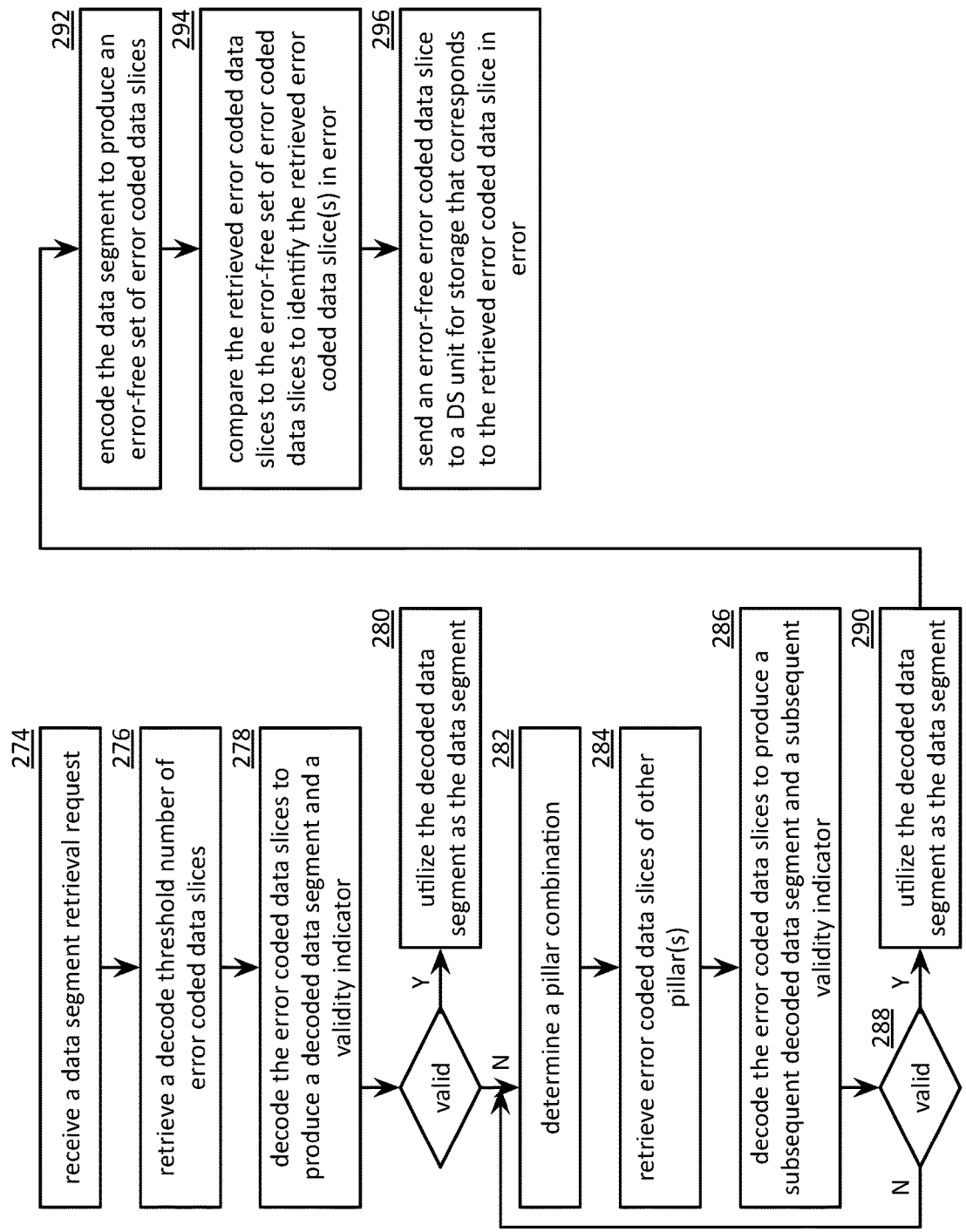
FIG. 14 is a flowchart illustrating an example of error correcting a data slice in accordance with the invention.

FIG. 14 is a flowchart illustrating an example of error correcting a data slice. The method begins with step 274 where a processing module (e.g., a dispersed storage (DS) processing unit) receives a data segment retrieval request. For example, the processing module retrieves a plurality of data segments to re-create a data object by generating a plurality of retrieval requests for the plurality of data segments. The method continues at step 276 where the processing module generates a plurality of data slice retrieval requests to retrieve a decode threshold number of error coded data slices in response to receiving the data segment retrieval request. For example, the processing module receives a source name associated with the data segment, determines a plurality of slice names for the data segment, determines a plurality of DS units associated with the plurality of slice names, and sends the plurality of data slice retrieval requests to the plurality of DS units. At step 276, the processing module receives a decode threshold number of error coded data slices in response to the plurality of retrieval requests.

The method continues at step 278 where the processing module decodes the error coded data slices in accordance with an error coding dispersal storage function to produce a decoded data segment and a validity indicator. For example, the processing module calculates a hash of the decoded data segment to produce the validity indicator. At step 278, the processing module determines whether the decoded data segment is valid by comparing a stored validity indicator (e.g., associated with the data segment) with the validity indicator. The processing module determines that the decoded data segment is valid when the stored validity indicator and the validity indicator are substantially the same. The method branches to step 282 when the processing module determines that the decoded data segment is not valid. The method continues to step 280 when the processing module determines that the decoded data segment is valid. The method continues to step 280 where the processing module utilizes the decoded data segment as the data segment when the processing module determines that the decoded data segment is valid.

The method continues at step 282 where the processing module determines a pillar combination such that the pillar combination specifies which pillars to retrieve and utilize data slices in an attempt to re-create a valid decoded data segment. Such a determination may be based on one or more of the pillar width, the threshold, a number of pillar combinations, which pillar combinations resulted in a previous test with a valid decoded data segment, and which pillar combinations resulted in a previous test with an invalid the decoded data segment. The processing module may utilize one or more techniques to determine the one or more data slices in error. For example, the processing module may choose to utilize slices from different pillar groups to initially determine where an error is sourced from. In an instance, the processing module may choose to utilize pillars 1-3 in a first test and pillars 3-5 in a second test when the pillar width is 5 and the threshold is 3. As another technique, the processing module may eliminate one pillar at a time. In an instance, the processing module may choose to utilize the following pillar combinations to eliminate pillar 2: 1, 3, 4; 1, 3, 5; 1, 4, 5; and 3, 4, 5.

The method continues at step 284 where the processing module retrieves error coded data slices of other pillar(s) in accordance with the pillar combination. The processing module may retrieve data slices of all of the pillars at once and subsequently perform the validity testing of decoded data segments from different combinations of pillars. The method continues at step 286 where the processing module decodes the error coded data slices in accordance with the error coding dispersal storage function to produce a subsequent decoded data segment and a subsequent validity indicator. At step 288, the processing module determines whether the subsequent decoded data segment is valid. The method branches back to step 282 (e.g., to try another pillar combination) when the processing module determines that the subsequent decoded data segment is not valid. The method continues to step 290 when the processing module determines that the subsequent decoded data segment is valid.

The method continues at step 290 where the processing module utilizes the subsequent decoded data segment as the data segment when the processing module determines that the subsequent data segment is valid. Alternatively, or in addition to, the processing module may end the testing loop when the error status has been determined for each data slice (e.g., each of the data slices in error have been identified). Alternatively, the process fails if all possible pillar combinations have been tried without producing a valid subsequent decoded data segment.

The method continues at step 292 where the processing module encodes the data segment in accordance with the error coding dispersal storage function to produce an error-free set of error coded data slices. The method continues at step 294 where the processing module compares the retrieved error coded data slices to the error-free set of error coded data slices to identify the retrieved error coded data slice(s) (and pillars) in error (e.g., a difference signifies an error). The method continues at step 296 where the processing module sends an error-free error coded data slice to a DS unit, wherein the DS unit corresponds to the pillar of the retrieved error coded data slice in error. The DS unit replaces the error coded data slice in error with the error-free error coded data slice. Alternatively, or in addition to, the processing module initiates a rebuilding process to identify and repair data slices in error.

FIGS. 15A-15D depict an example of a dispersed storage network (DSN) memory where a first plurality of DS units 36 are implemented in a local location and a second plurality of DS units 36 are implemented in a remote location. For example, the local location is proximate to a DS processing unit utilized to store and retrieve data slices to the DSN memory and the remote location is not proximate to the DS processing unit and the local location. As such, the network 24 operably couples the DS processing unit to the plurality of DS units 36 at the remote location. FIGS. 15A-15D individually depict configuration examples of error coding dispersal storage function parameters (e.g., pillar width, threshold) and pillar assignments to DS units of one or both of the plurality of DS units. Note that the configurations are associated with a storage policy that includes optimization objectives such as cost, reliability, security, and performance. The configurations and objectives are discussed in greater detail with reference to FIGS. 15A-15D. A method to determine and implement the configuration of the storage policy is discussed in greater detail with reference to FIG. 16.

Figure 15A:
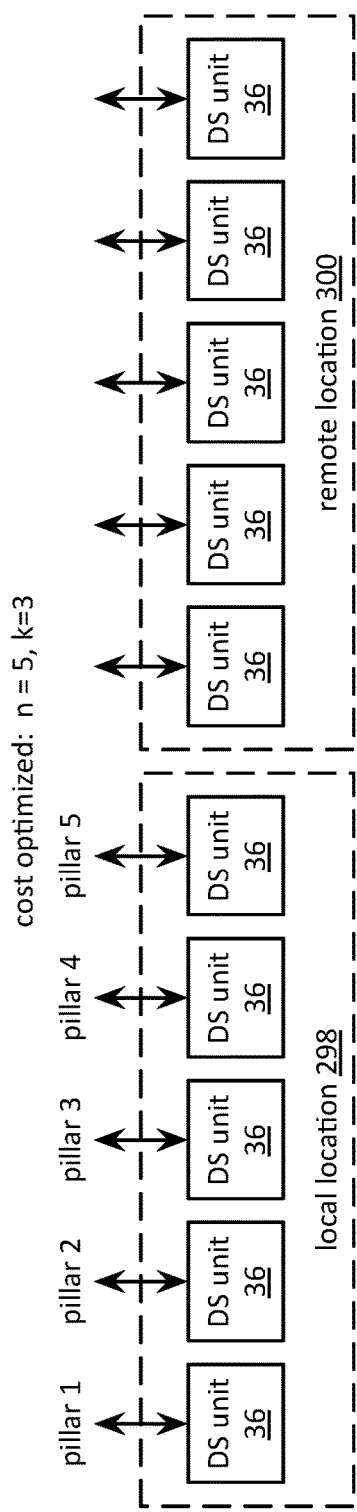
FIG. 15A is a schematic block diagram of an embodiment of a pillar assignment of a dispersed storage network memory in accordance with the invention.

FIG. 15A is a schematic block diagram of an embodiment of a pillar assignment of a dispersed storage network (DSN) memory. The DSN memory includes a plurality of dispersed storage (DS) units 36 at a local location 298 and a plurality of DS units 36 at a remote location 300. Combinations of DS units 36 from one or both of the local location 298 and the remote location 300 may be assigned to form a DS unit storage set in accordance with a system design objective, wherein the DS unit storage set accommodates storing a pillar width number (n) of encoded data slices as a set of encode slices. For example, pillars 1-5 of a set of encoded data slices are assigned to five DS units 36 of the local location 298 when a pillar width n=5 and a decode threshold k=3 (e.g., no pillars of the set of encoded data slices are assigned to DS units of the remote location 300). Such a configuration may be associated with a system designed objective of low-cost since utilized DS units 36 are all located at the local location 298 (e.g., no remote location 300 costs) and the pillar width is relatively low as compared to other configurations thus lowering costs associated DS units 36.

Figure 15B:
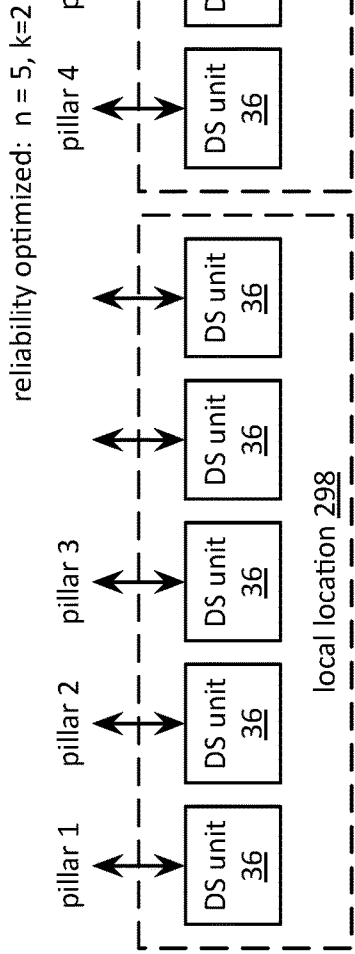
FIG. 15B is a schematic block diagram of another embodiment of a pillar assignment of a dispersed storage network memory in accordance with the invention.

FIG. 15B is a schematic block diagram of another embodiment of a pillar assignment of a dispersed storage network (DSN) memory. The DSN memory includes a plurality of dispersed storage (DS) units 36 at a local location 298 and a plurality of DS units 36 at a remote location 300. In an implementation example, pillars 1-3 of a set of encoded data slices are assigned to three DS units 36 of the local location 298 and pillars 4-5 of the set of encoded data slices are assigned two DS units 36 of the remote location 300 when a pillar width n=5 and a decode threshold k=2. Such a configuration may be associated with a system designed objective of improved reliability since a decode threshold number of pillars are included in both the local location 298 and the remote location 300. As such, data may be retrieved from one location even when the other location is not available.

Figure 15C:
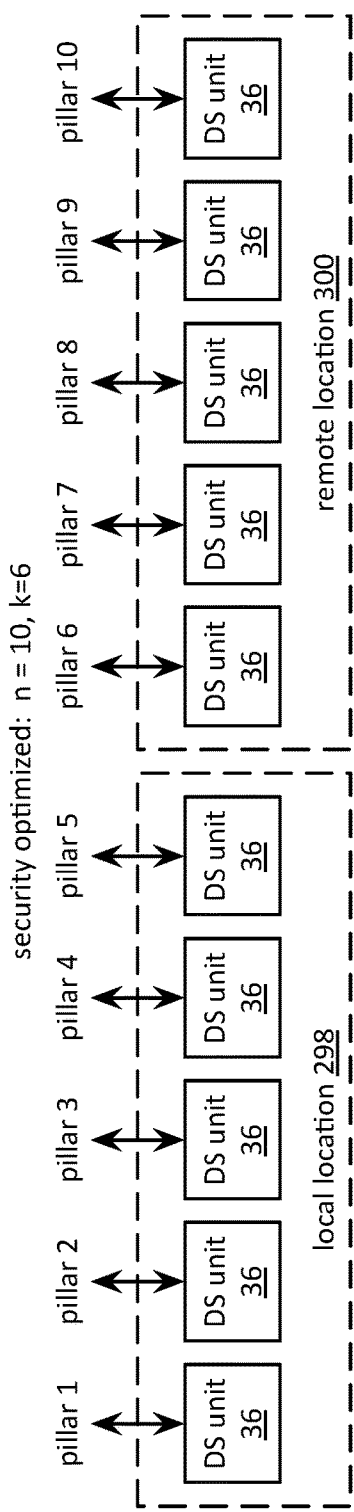
FIG. 15C is a schematic block diagram of another embodiment of a pillar assignment of a dispersed storage network memory in accordance with the invention.

FIG. 15C is a schematic block diagram of another embodiment of a pillar assignment of a dispersed storage network (DSN) memory. The DSN memory includes a plurality of dispersed storage (DS) units 36 at a local location 298 and a plurality of DS units 36 at a remote location 300. In an implementation example, pillars 1-5 of a set of encoded data slices are assigned to five DS units 36 of the local location 298 and pillars 6-10 of the set of encoded data slices are assigned five DS units 36 of the remote location 300 when a pillar width n=10 and a decode threshold k=6. Such a configuration may be associated with a system designed objective of improved security since the decode threshold is relatively high with respect to the pillar width, encoded data slices of the pillars are stored in more than one location, and a decode threshold number of encoded data slices does not exist at a single location.

FIG. 15D is a schematic block diagram of another embodiment of a pillar assignment of a dispersed storage network (DSN) memory. The DSN memory includes a plurality of dispersed storage (DS) units 36 at a local location 298 and a plurality of DS units 36 at a remote location 300. In an implementation example, pillars 1-5 of a set of encoded data slices are assigned to five DS units 36 of the local location 298 and pillars 6-10 of the set of encoded data slices are assigned five DS units 36 of the remote location 300 when a pillar width n=10 and a decode threshold k=4. Such a configuration may be associated with a system designed objective of improved reliability since a decode threshold number of pillars are stored in both locations and the decode threshold is relatively low with respect to the pillar width. As such, there are 210 ways (e.g., 10 choose 4) to successfully retrieve a decode threshold number of encoded data slices from DS units 36 of the remote location 298 and the remote location 300.

FIG. 16 is a flowchart illustrating an example of implementing a storage policy. The method begins with step 302 where a processing module (e.g., of a dispersed storage (DS) processing unit) determines a current storage policy. The current storage policy may include one or more of a storing policy, a retrieving policy, an aggregate storing and retrieving policy. The determination may be based on one or more of a lookup, a query, a list, a message, and a command. The method continues at step 304 where the processing module determines storage requirements, wherein the requirements includes one or more objectives related to cost, reliability, performance, and security. The determination may be based on one or more of a cost requirement, a reliability requirement, a performance requirement, a security requirement, a user input, an indicator, an error message, a request, a message, and a command.

The method continues at step 306 where the processing module determines a new storage policy based on one or more of the current storage policy, a policy guideline, minimum requirements, and the storage requirements. For example, the processing module determines a new storage policy to lower costs when there was no current storage policy and the storage requirements indicate a low-cost is favored over other objectives. As another example, the processing module determines the new storage policy to optimize reliability when the current storage policy is optimized for cost and the storage requirements indicate that reliability is now preferred over cost.

The method continues at step 308 where the processing module determines available storage resources (e.g., DS units, locations of DS units, network connectivity availability, etc.). The determination may be based on one or more of a table lookup, a list, a query, a message, and a command. For example, the processing module determines the available resources to include a first group of five DS units at a local location and a second group of five DS units at a remote location. The method continues at step 310 where the processing module determines an optimized configuration of storage resources based on the new storage policy and the available storage resources. The determination includes selecting one alternative configuration of a plurality of alternative configurations of the storage resources based on evaluating a fit of the alternative configuration to the new storage policy and storage requirements. The evaluation may include analyzing individual parameters of cost, reliability, and security.

The method continues at step 312 where the processing module determines whether cost optimization is required based on the optimized configuration. The method branches to step 316 when the processing module determines that cost optimization is not required. The method continues at step 314 where the processing module optimizes the configuration for cost (e.g., one location, a small pillar width) when the processing module determines to optimize for cost. The method continues at step 316 where the processing module determines whether reliability optimization is required based on the optimized configuration. The method branches to step 320 when the processing module determines that reliability optimization is not required. The method continues at step 318 where the processing module optimizes the configuration for reliability (e.g., greater than one location, a small threshold) when the processing module determines to optimize for reliability. The method continues at step 320 where the processing module determines whether security optimization is required based on the optimized configuration. The method branches to step 324 when the processing module determines that security optimization is not required. The method continues that step 322 where the processing module optimizes the configuration for security (e.g., greater than one location, a larger threshold) when the processing module determines to optimize for security.

The method continues at step 324 where the processing module determines whether to move slices based on the optimized configuration. For example, the processing module determines to move slices from a DS unit of the local location to a DS unit of the remote location to address improved reliability and/or or security. The method branches to step 328 when the processing module determines to not move slices. The method continues at step 326 where processing module moves error coded data slices when the processing module determines to move data slices. The method continues at step 328 where the processing module determines whether to re-encode error coded data slices based on the optimized configuration. For example, the processing module determines to re-encode when changing error coding dispersal storage function parameters (e.g., a new pillar width, a new threshold). The method branches to step 332 when the processing module determines to not re-encode error encoded data slices. The method continues at step 330 where the processing module re-encodes error coded data slices (e.g., retrieve the old slices, decode the old slices to produce a data segment, encode the data segment to produce re-encoded data slices, store the re-encoded data slices, delete the old slices) when the processing module determines to re-encode error coded data slices. The method continues at step 332 where the method ends.

FIGS. 17A-17C depict an example of a dispersed storage network (DSN) memory that includes a variable number of dispersed storage (DS) units 36 depicting a migration scenario from a starting step of FIG. 17A, to a mid-step of FIG. 17B, to an ending step of FIG. 17C. At each step, the DS units 36 are assigned pillars of a corresponding set of encoded data slices in accordance with error coding dispersal storage function parameters (e.g., pillar width, decode threshold, etc.). The migration scenario steps support migration objectives including expanding and contracting storage resources. For example, the storage resources may be expanded to support a migration objective to add more DS units 36 and/or retire older DS units 36. As another example, the storage resources may be contracted support a migration objective to shrink a number of DS units 36. As illustrated, the DS units 36 of FIGS. 17A-17C are configured to support a migration objective to retire three of five DS units by adding three DS units, temporarily resulting in eight DS units 36, followed by retirement of three original DS units 36 to end the scenario with five DS units 36. The migration objectives and configurations are discussed in greater detail with reference to FIGS. 17A-17 C. A method to expand and contract storage resources is discussed in greater detail with reference to FIG. 18.

FIG. 17A is a schematic block diagram of another embodiment of a pillar assignment of a dispersed storage network (DSN) memory. Five dispersed storage (DS) units 36 correspond to a step 1 of a migration scenario when a pillar width is 5 and a decode threshold is 3. A migration objective may include retiring three of the five DS units 36. For example, the three DS units 36 may have aged past a DS unit age threshold where it is desired to retire DS units that have aged past the threshold. As another example, error messages and/or performance history may indicate that the three DS units 36 should be retired.

FIG. 17B is a schematic block diagram of another embodiment of a pillar assignment of a dispersed storage network (DSN) memory. Three dispersed storage (DS) units 36 are newly provisioned resulting in eight DS units 36 correspond to a step 2 of a migration scenario when a pillar width is expanded to 8 and a decode threshold remains 3. As such, the three newly provisioned DS units 36 are assigned to expansion pillars 6-8. A migration objective may include retiring a first three of an initial five DS units 36 without moving encoded data slices from the first three DS units 36.

At step 2 of the migration scenario, encoded data slices corresponding to the expansion pillars are generated and stored in the three expansion DS units 36. For example, a decode threshold number of encoded data slices are retrieved from the initial five DS units 36, the encoded slices are decoded in accordance with an error coding dispersal storage function (e.g., n=5) to produce a data segment, the data segment is encoded in accordance with new error coding dispersal storage function parameters (e.g., n=8) to produce encoded data slices corresponding to the expansion pillars.

FIG. 17C is a schematic block diagram of another embodiment of a pillar assignment of a dispersed storage network (DSN) memory. Three dispersed storage (DS) units 36 of an initial five DS units 36 are retired resulting in five DS units 36 correspond to a step 3 of a migration scenario when a pillar width was expanded to 8 and a decode threshold remains 3. As such, there is no need to modify encoded data slices of the remaining three DS units 36 corresponding to pillars 4-6 since data segments can be successfully decoded based on retrieving a decode threshold number (e.g., 3 pillars) of data slices from any of the remaining DS units. In such a migration scenario, a total number of DS units 36 and the decode threshold is the same in steps 1 and 3 and there are still 5 choose 3 ways to retrieve the decode threshold number of encoded data slices.

Figure 18:
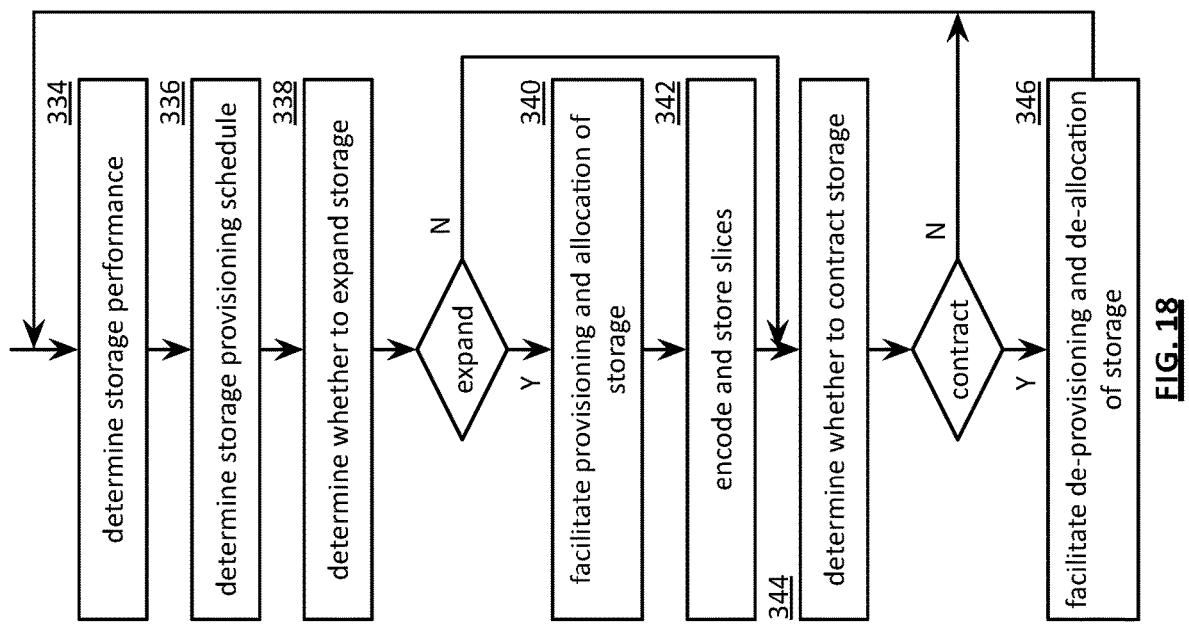
FIG. 18 is a flowchart illustrating an example of expanding and contracting storage resources in accordance with the invention.

FIG. 18 is a flowchart illustrating an example of expanding and contracting storage resources. The method begins with step 334 where a processing module (e.g., dispersed storage (DS) processing unit) determines storage performance based on one or more of a query, and error message, a lookup, a message, and a command. Storage performance may include one or more of memory device uptime, mean time to failure, mean time to repair, access latency, access bandwidth, and network performance. The method continues at step 336 where the processing module determines a storage provisioning schedule based on one more of the storage performance, storage requirements, a previous schedule, a command, a lookup, a query, a request, and a message. The storage provisioning schedule may include one or more of an expansion requirement, a contraction requirement, a provisioning schedule, and a de-provisioning schedule.

The method continues at step 338 where the processing module determines whether to expand storage. Expansion of storage may include one more of adding memory devices, adding DS units, adding a dispersed storage network (DSN) memory, activating dormant storage, and allocating more memory of already provisioned memory devices. The determination may be based on one or more of the provisioning schedule, the storage performance, an expansion indicator, a storage requirement, and a comparison of the storage performance to the requirement. For example, the processing module determines to expand storage when the storage provisioning schedule indicates that more storage is to be added when the storage performance indicates a 10% fall of the mean time to failure in any ten day period. The method branches to step 344 when the processing module determines to not expand storage. The method continues to step 340 when the processing module determines to expand storage.

The method continues at step 340 where the processing module facilitates provisioning and allocation of storage. For example, the processing module sends a message to a DS managing unit communicating a need to add more DS units to a system. As another example, the processing module activates dormant DS units. As yet another example, the processing module allocates more memory of an existing DS unit to a vault. As a still further example, the processing module determines a new pillar width. The method continues at step 342 where the processing module encodes and stores slices. For example, the processing module re-encodes data slices in accordance with a new pillar width and stores re-encoded data slices in newly allocated storage. As another example, the processing module retrieves encoded data slices of a corresponding vault and sends the encoded data slices to the newly allocated storage.

The method continues at step 344 where the processing module determines whether to contract storage. Contraction of storage may include one more of deactivating memory devices, removing DS units, deactivating DS units, removing a DSN memory, turning off active storage, and de-allocating memory of provisioned memory devices. The determination may be based on one or more of a de-provisioning schedule, storage performance, a contraction indicator, a storage requirement, and a comparison of the storage performance to a requirement. For example, the processing module determines to contract storage when the storage de-provisioning schedule indicates that storage is to be removed when the storage performance indicates a 20% rise of the mean time to failure in any ten day period. The method repeats back to step 334 when the processing module determines to not contract storage. The method continues to step 346 when the processing module determines to contract storage.

The method continues at step 346 where the processing module facilitates de-provisioning and de-allocation of storage. The de-provisioning and de-allocation may include one or more of deactivating a memory device, deactivating a DS unit, deactivating a DSN memory, de-allocating memory from one or more faults, turning off the memory device, turning off a DS unit, and retrieving slices from a primary memory device and storing them in a different memory device or DS unit followed by turning off the primary memory device. The method repeats back to step 334.

Figure 19:
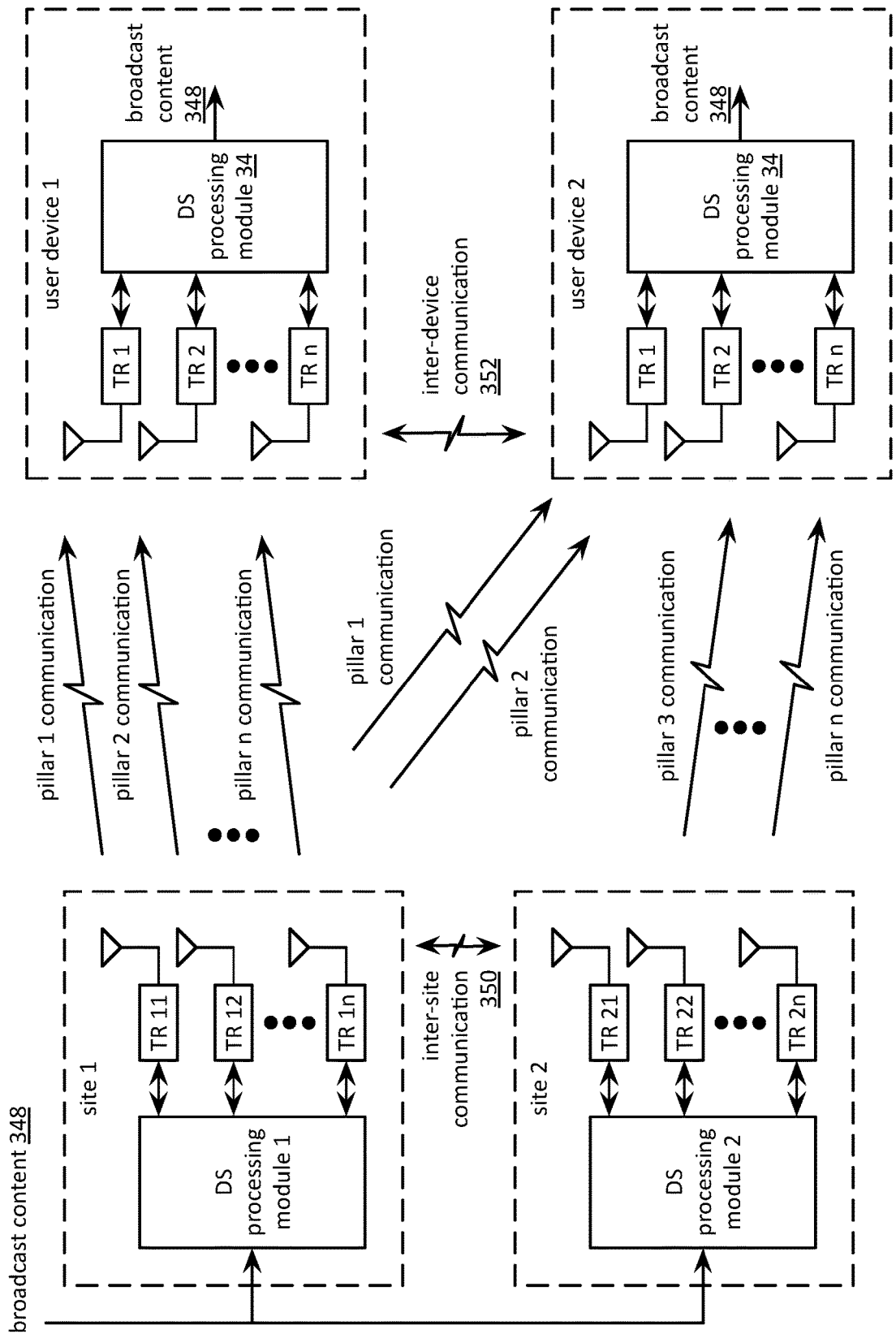
FIG. 19 is a schematic block diagram of an embodiment of a communication system in accordance with the invention.

FIG. 19 is a schematic block diagram of an embodiment of a communication system. The system includes a site 1, a site 2, a user device 1, and a user device 2. The site 1 includes a DS processing module 1 and a plurality of n transmitter receiver (TR) modules 11-1$n$. The site 2 includes a DS processing module 1 and a plurality of n TR modules 21-2$n$. The user device 1 and the user device 2 includes a DS processing module 34 and a plurality of n TR modules 1-$n$. The TR modules may be implemented as at least one of n wireless hardware transceivers or fewer than n frequency multiplexed, time multiplexed, or the like, as n software modules operating on one hardware transceiver (e.g., a software defined radio (SDR)), and as n software modules operating on two or more hardware transceivers (e.g., software defined radios).

The DS processing modules 1-2 receive broadcast content 348 (e.g., video, multimedia, audio, music, voice, data streaming, etc.), determine error coding dispersal storage function parameters, encode the broadcast content to produce error encoded data slices of n pillars in accordance with the error coding dispersal storage function parameters, determine a wireless configuration, configure TR modules 11-1$n$ and 21-2$n$ in accordance with the wireless configuration, and send the error encoded data slices via the TR modules to produce pillar 1-n communication as wireless signals. For example, DS processing module 1 sends error encoded data slices of all 16 pillars from TR modules 11-1$n$ as wireless signals when a pillar width is 16 (e.g., pillar 1 communication from TR module 11, pillar 2 communication from TR module 12, pillar 3 communication from TR module 13, etc.). As another example, DS processing module 2 sends pillar 3 communication from TR module 23, through sending pillar 16 communications from TR module 2$n$ when the pillar width is 16. The method of operation of the DS processing modules 1-2 is discussed in greater detail with reference to FIG. 21.

The TR modules communicate wireless signals with other TR modules of the system and may operate in accordance with one or more wireless industry protocol standards including but not limited to universal mobile telecommunications system (UMTS), global system for mobile communications (GSM), long term evolution (LTE), wideband code division multiplexing (WCDMA), IEEE 802.11, IEEE 802.16, WiMax, Bluetooth, or any other local area network (LAN), wide area network (WAN), personal area network (PAN) or like wireless protocol. As such, any two, four, or any number of TR modules may utilize one or more of the same or different wireless protocols. For example, TR module 11 may utilize GSM and TR module 12 may simultaneously utilize IEEE 802.16.

The TR modules 1-$n$ may utilize similar or different performance levels (e.g., speed in bits per second) of the wireless signals. For example, TR module 14 may communicate at 100 kilo bits per second (Kbps) via pillar 4 communication wireless signals in accordance with the WCDMA standard and TR module 17 may simultaneously communicate at 3.3 mega bits per second (Mbps) via pillar 7 communication wireless signals in accordance with IEEE 802.11 standard. As another example, TR module 14 and TR module 17 may both function in accordance with the IEEE802.16 standard but operate at different performance levels. For instance, TR module 14 may communicate at 350 kilo bits per second via pillar 4 communication wireless signals in accordance with the IEEE 802.16 standard and TR module 17 may simultaneously communicate at 675 kilo bits per second via pillar 7 communication wireless signals in accordance with IEEE 802.16 standard. Since software defined radios are possible in some embodiments, such protocols may be changed over time according to a predetermined security algorithm whereby the protocol is changing over time.

Site 1 and site 2 communicate with each other to facilitate coordination of the transmission of pillar communications. For example, such coordination communication is facilitated via a wireless inter-site communication 350. As another example, the coordination communication is facilitated via a wireline inter-site communication. In an example of coordination, site 1 sends a message to site 2 that site 1 will transmit pillars 1-5 and site 2 will transmit pillars 6-8 of the same data segment when the pillar width is 8.

The DS processing module 34 of user device 1 or 2 receives the broadcast content by determining a wireless configuration for TR modules 1-*n*, configuring the TR modules in accordance with the wireless configuration, determining error coding dispersal storage function parameters, receiving pillar communication via of the TR modules, decoding received data slices from the pillar communication in accordance with the error coding dispersal storage function parameters to produce the broadcast content 348. For example, user device 1 receives pillar 1-n communications from site 1 to receive a decode threshold number of error encoded data slices to decode reproducing the broadcast content 348. As another example, user device 2 receives pillar 1-2 communications from site 1 and pillar 3-n communications from site 2 to receive a decode threshold number of error encoded data slices to decode producing the broadcast content 348. As yet another example, user device 2 receives pillar 1-2 communications from user device 1 via an inter-device wireless communication 352 and pillar 3-n communications from site 2 to receive a decode threshold number of error encoded data slices to decode reproducing the broadcast content 348. The inter-device wireless communications 352 is utilized to communicate pillar communications and coordination information between two or more user devices. The coordination information includes requests and responses to forward particular pillar communications. For example, user device 2 sends a pillar 1-2 communication request via the inter-device wireless communication 352 to user device 1. User device 1 forwards pillar 1-2 communications to user device 2 via inter-device wireless communications 352 in response. The method of operation of the DS processing module of the user devices 1-2 is discussed in greater detail with reference to FIGS. 20, 23, and 24.

Figure 20:
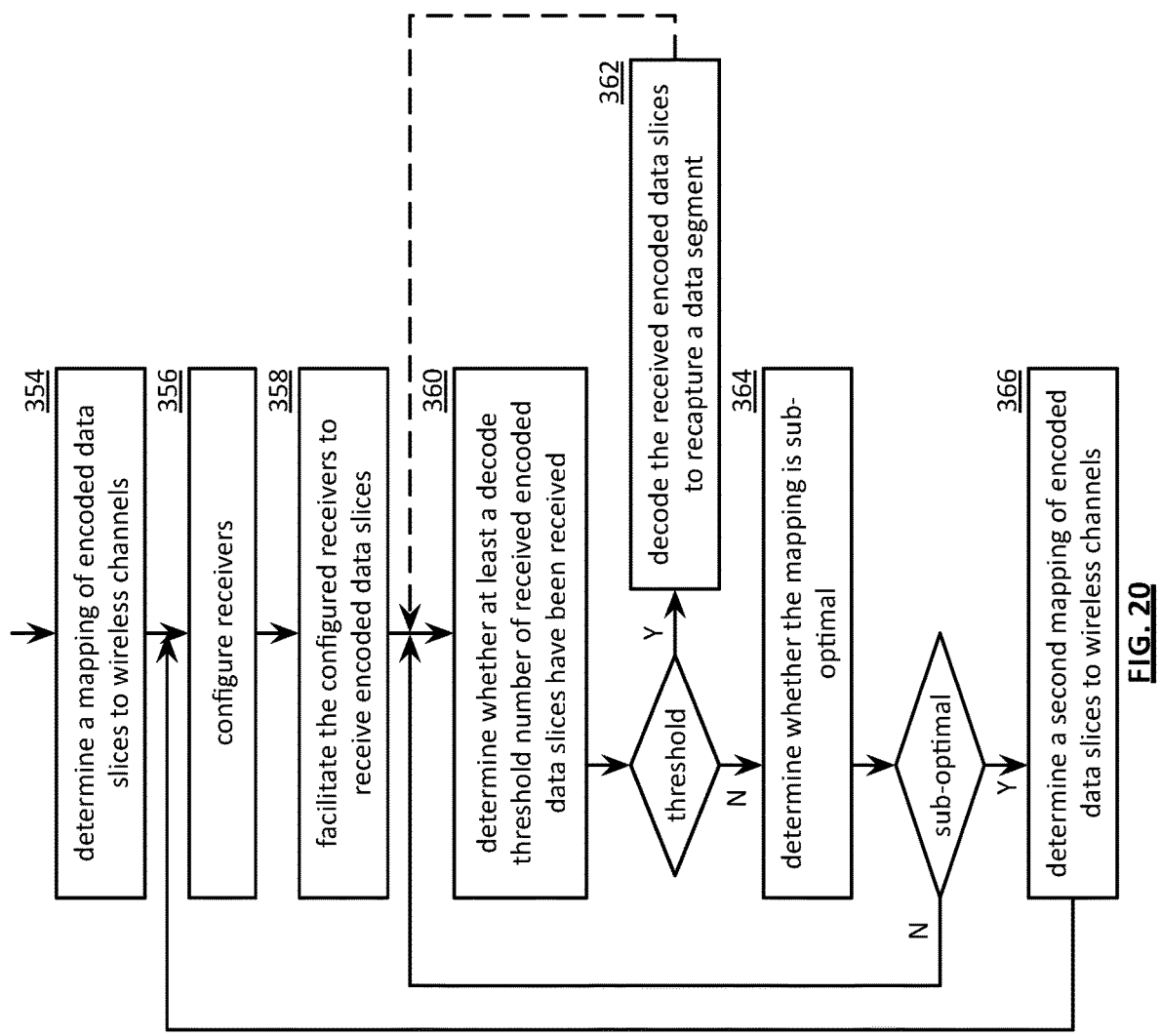
FIG. 20 is a flowchart illustrating an example of acquiring a content broadcast in accordance with the invention.

FIG. 20 is a flowchart illustrating an example of acquiring a content broadcast. The method begins with step 354 where a processing module (e.g., of a user device) determining a mapping of encoded data slices to wireless channels for wireless communication of data, wherein a data segment of the data is encoded in accordance with a dispersed storage error encoding protocol to produce a set of encoded data slices and wherein a first encoded data slice of the set of encoded data slices is associated with a first wireless channel of a set of wireless channels. The mapping includes one or more of a pillar to wireless channel mapping, wherein the dispersed storage error encoding protocol prescribes a set of pillars, a data segment to wireless channel mapping, and an encoded data slice pattern to wireless channel mapping (e.g., a combination of pillars and segments).

As a mapping example, the processing module determines to receive pillars 1-2 from site 1 and pillars 3-16 from site 2 when the processing module determines that pillars 1-2 can only be received from site 1 and pillars 3-16 can only be received from site 2. As another example, the processing module determines to receive pillars 1-8 from site 1 and pillars 9-16 from site 2 when all 16 pillars are transmitted from both sites and the wireless signal quality indicator indicates that pillar 1-8 communications from site 1 is preferred to pillar 1-8 communications from site 2 and that pillar 9-16 communications from site 2 is preferred to pillar 9-16 communications from site 1. As yet another example, the processing module determines wireless parameters to optimize a resulting wireless signal quality indicator. For instance, the processing module determines to utilize a slower wireless signal to improve reliability of the wireless communications.

The determining of the mapping may be based on at least one of receiving a broadcast indicator, a broadcast status indicator, a user device data requirement (e.g., another user device desires the same data segment), a previously utilized access method, a data access response, a message, a pillar broadcast indicator, and a wireless signal indicator. For example, the processing module determines the mapping to include a first mapping of a first collective of encoded data slices of the set of encoded data slices to at least one wireless channel of a first transmission site and a second mapping of a second collective of encoded data slices of the set of encoded data slices to at least one wireless channel of a second transmission site.

The method continues at step 356 where the processing module configures, in accordance with the mapping, receivers of a wireless communication device to receive, via a set of wireless channels, at least some of the set of encoded data slices to produce configured receivers. The configuring the receivers includes configuring a first receiver of the receivers to receive the first encoded data slice via a first wireless channel of the set of wireless channels, configuring a second receiver of the receivers to receive a second encoded data slice of the set of encoded data slices via a second wireless channel of the set of wireless channels, and configuring a third receiver of the receivers to receive a third encoded data slice of the set of encoded data slices via a third wireless channel of the set of wireless channels. At step 356, the processing module configures, in accordance with the mapping, a first receiver of the receivers to receive at least some of the set of encoded data slices via a first wireless channel of the set of wireless channels and a second receiver of the receivers to receive at least some of the second set of encoded data slices via a second wireless channel of the set of wireless channels when a second data segment of the data is encoded in accordance with the dispersed storage error encoding protocol to produce a second set of encoded data slices.

At step 356, the processing module may generate a configuration signal regarding optimal operational characteristics of at least one of the configured receivers and facilitate transmission of the configuration signal. For example, the processing module facilitates transmission of the configuration signal to a transmitter corresponding to at least one receiver such that transmitter configuration includes information of the configuration signal.

The method continues at step 358 where the processing module facilitates the configured receivers to receive encoded data slices of the set of encoded data slices to produce received encoded data slices. At step 358, the processing module facilitates the first receiver to receive the encoded data slices of the set of encoded data slices to produce the received encoded data slices and facilitates the second receiver to receive encoded data slices of the second set of encoded data slices to produce second received encoded data slices when the second data segment of the data is encoded in accordance with the dispersed storage error encoding protocol to produce the second set of encoded data slices.

The method continues at step 360 where the processing module determines whether at least a decode threshold number of received encoded data slices have been received within a predetermined period of time. At step 360, the processing module determines whether at least a decode threshold number of the second received encoded data slices have been received when the second data segment of the data is encoded in accordance with the dispersed storage error encoding protocol to produce the second set of encoded data slices. The method branches to step 364 when the processing module determines that the decode threshold number of received encoded data slices have not been received within the predetermined period of time. The method continues to step 362 when the processing module determines that the decode threshold number of received encoded data slices have been received.

The method continues at step 362 where the processing module decodes the received encoded data slices to recapture the data segment when at least the decode threshold number of received encoded data slices have been received. At step 362, the processing module decodes the second received encoded data slices to recapture the second data segment when at least the decode threshold number of the second received encoded data slices have been received. Alternatively, the method may loop back to step 360 when more data segments are to be recaptured.

The method continues at step 364 where the processing module determines whether the mapping is sub-optimal based on wireless communication conditions when the decode threshold number of encoded data slices have not been received within the predetermined period of time. The determining whether the mapping is sub-optimal includes at least one of determining that a performance indicator associated with at least one of the configured receivers compares unfavorably to a performance threshold and determining that a signaling indicator associated with the at least one of the configured receivers compares unfavorably to the performance threshold. The performance indicator includes one or more of a received bit rate, a number of encoded slices received per second, a number of pillars received per second, which pillars are being received, and which pillars are not been received. The signaling indicator includes one or more of a received bit rate, a received bit error rate, an interference level, a loss of wireless signal indicator, and a wireless signal level indicator.

The method repeats back to step 362 continue to receive encoded data slices when the processing module determines that the mapping is not sub-optimal. The method continues to step 366 when the processing module determines that the mapping is sub-optimal. The method continues at step 366 where the processing module determines a second mapping of encoded data slices to wireless channels based on the wireless communication conditions when the mapping is sub-optimal. The method loops back to step 356 to configure receivers in accordance with the second mapping.

Figure 21:
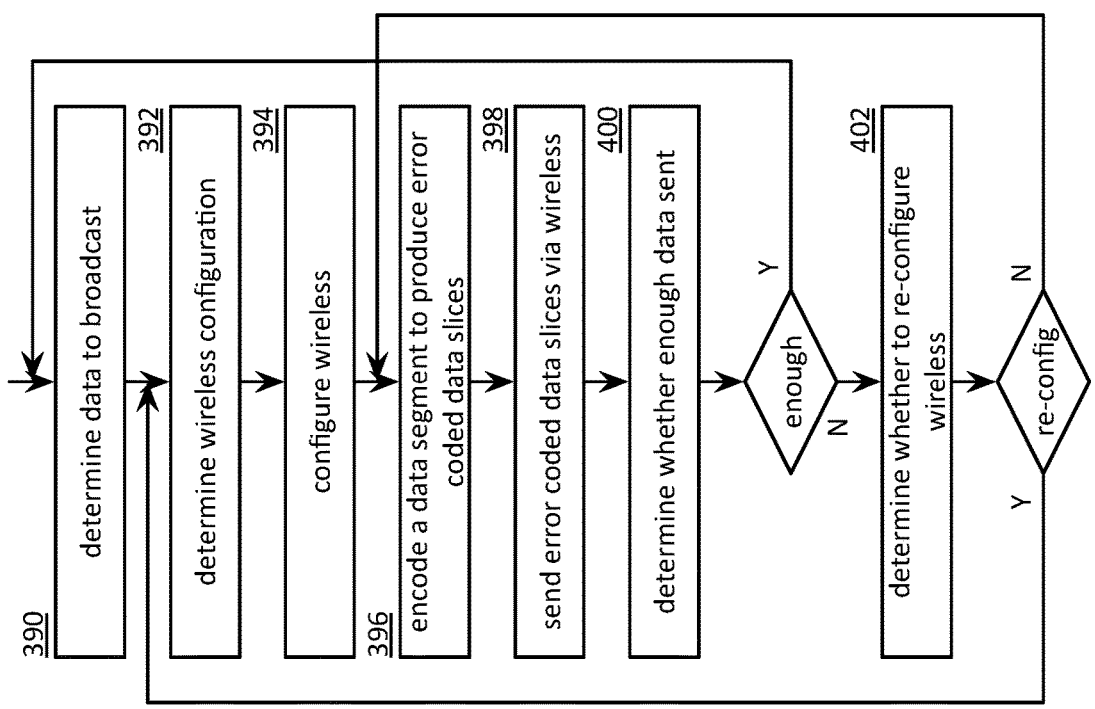
FIG. 21 is a flowchart illustrating an example of generating a content broadcast in accordance with the invention.

FIG. 21 is a flowchart illustrating an example of generating a content broadcast. The method begins with step 390 where a processing module (e.g., of a dispersed storage (DS) processing unit) determines data to broadcast based on one or more of a data segment indicator, a next data segment of a data object indicator, an application request, a user input, a message, a request from a user device, a request from a site, and a command. The method continues at step 392 where the processing module determines a wireless configuration based on one or more of a quality level indicator of a wireless communications path from a site to one or more user devices, user devices within wireless range, required pillars, and which pillars are being transmitted by which transceiver (TR) module. The wireless configuration may include one or more of wireless parameters for the TR modules, configuring TR modules to broadcast particular pillars, and indicating that one or more other sites and/or user devices broadcast particular pillars.

The method continues at step 394 where the processing module configures the wireless. The configuring includes sending wireless configuration information to TR modules associated with one or more sites and/or one or more user devices. The method continues at step 396 where the processing module encodes a data segment in accordance with an error coding dispersal storage function to produce error coded data slices. The method continues at step 398 where the processing module sends the error coded data slices utilizing the TR modules as pillar communications via wireless signals. The method continues at step 400 where the processing module determines whether enough data has been sent based on one or more of a number of data segments in the data object, a number of data slices sent, a number of data segments sent, a number of outstanding data segments to be sent, and a number of outstanding data slices to be sent. The method branches back to step 390 when the processing module determines that enough data has been sent. The method continues to step 402 when the processing module determines that not enough data has been sent.

The method continues at step 402 where the processing module determines whether to reconfigure the wireless based on one or more of monitoring a wireless signal quality level indicator indicating performance of the wireless communications paths (e.g., receiving feedback from one or more user devices), a performance threshold, and comparing the wireless signal quality level to the performance threshold. For example, the processing module determines to reconfigure the wireless when receiving a request from a user device to start sending more pillars via a particular wireless communications path that is more favorable for the user device. As another example, the processing module determines to reconfigure the wireless to increase the speed of a TR module when receiving a message from a user device that indicates that a transmission speed is too slow on an associated wireless communications path. As yet another example, the processing module determines to reconfigure the wireless to align with a configuration objective (e.g., cost, performance, reliability, a balance between these factors, etc.) where the configuration objective may be determined based on a predetermination, a lookup, a user device requests, a performance driven dynamic, and from another site. Configuration objectives, wireless configuration, and pillars assignments are discussed in greater detail with reference to FIG. 22. The method branches back to step 396 when the processing module determines not to reconfigure the wireless. The method branches back to step 392 when the processing module determines to reconfigure the wireless.

FIG. 22 is a table illustrating an example of wireless configuration and pillar assignments 420. The wireless configuration and pillar assignments 420 represents pillar number and communication speed assignments for each transceiver (TR) of a plurality of TR modules 1-5 in accordance with an optimization objective when a pillar width is five. The optimization objectives includes cost, performance, reliability, balance A (e.g., mixed objectives), and balance B. A cost field 422 includes a pillars field 432 and a speed field 434, a performance field 424 includes a pillars field 436 and a speed field 438, a reliability field 426 includes a pillars field 440 and a speed field 442, a balance A field 428 includes a pillars field 444 and a speed field 446, and a balance B field 430 includes a pillars field 448 and a speed field 450. Each pillars field 432, 436, 440, 444, 448 includes one or more pillar numbers of encoded data slices that are to be transmitted from a corresponding transceiver of TR 1-5. Each speed field 434, 438, 442, 446, 450 includes a relative speed indicator for transmission of the one or more pillar numbers of encoded data slices that are to be transmitted from the corresponding transceiver of TR 1-5.

In a cost optimized example, TR module 1 transmits pillars 1-5 at a normal 1× relative wireless speed. Using one TR module may lower cost as desired. In a performance optimized example, TR module 1 transmits pillar 1 at a 2× relative wireless speed, TR module 2 transmits pillar 2 at 2×, TR module 3 transmits pillar 3 at 2×, TR module 4 transmits pillar 4 at 2×, and TR module 5 transmits pillar 5 at 2×. A performance improvement is provided by sending pillars 1-5 simultaneously via parallel communications paths. In a reliability optimized example, TR modules 1-5 transmit pillars 1-5 as in the performance optimized example but at a 1× speed.

In a balance A optimized example, TR modules 1-3 transmit pillars 1-3 at the 1× relative wireless speed and TR module 4 transmits pillars 4-5 at the 2× relative wireless speed. A balance is provided between cost and reliability by utilizing one less TR module but yet at a similar throughput as the reliability optimized example. In a balance B optimized example, TR module 1 transmits pillars 1-2 at a 4× speed, TR module 2 transmits pillars 3-4 at a 4× speed, and TR module 3 transmits pillar 5 at a 2× speed. Note that a balance is provided between cost and performance by utilizing two fewer TR modules but yet at a similar throughput as the performance example. Note that a decode threshold number of encoded data slices are received at a 2× rate even when any one of the TR modules is not operable.

Figure 23:
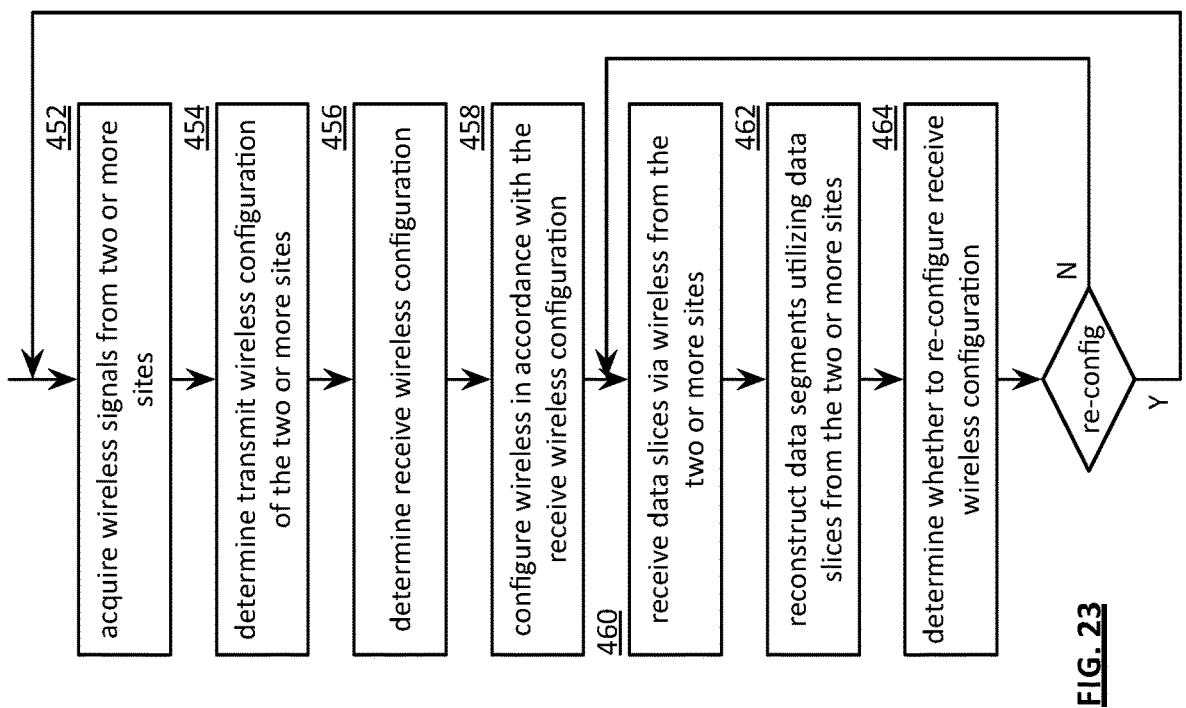
FIG. 23 is a flowchart illustrating another example of acquiring a content broadcast in accordance with the invention.

FIG. 23 is a flowchart illustrating another example of acquiring a content broadcast. The method begins with step 452 where a processing module (e.g., of a user device) acquires wireless signals from two or more sites. The wireless signal acquisition may include one or more of scanning, searching channels from a predetermined list, searching channels from a previous wireless cyclist, searching channels based on location, and searching all channels. The method continues at step 454 where the processing module determines transmit wireless configuration of two or more sites based on one or more of receiving the transmit wireless configuration information from the two or more sites and analyzing received information to extract transmit wireless configuration information (e.g., pillar number assignment to wireless paths).

The method continues at step 456 where the processing module determines receive wireless configuration to enable receiving data slices of desired pillars based on one or more of a wireless quality level indicator, an indicator of sites within range, an indicator of user devices within range, and a pillar to wireless communications path assignment indicator. The method continues at step 458 where the processing module configures wireless transceiver (TR) modules in accordance with the receive wireless configuration by sending the receive wireless configuration information to the TR modules associated with the processing module. The method continues at step 460 where the processing module receives encoded data slices via reception of wireless signals from transmitting TR modules of the two or more sites. The method continues at step 462 where the processing module decodes the encoded data slices from the two or more sites in accordance with an error coding dispersal storage function to produce reconstructed data segments.

The method continues at step 464 where the processing module determines whether to reconfigure the receive wireless configuration. The determination may be based on one or more of the wireless quality level indicator, the indicator of sites within range, the indicator of user devices within range, and the pillar to wireless communications path assignment indicator. The method branches back to step 460 when the processing module determines not to reconfigure the receive wireless configuration. The method loops back to step 452 when the processing module determines to reconfigure the receive wireless.

Figure 24:
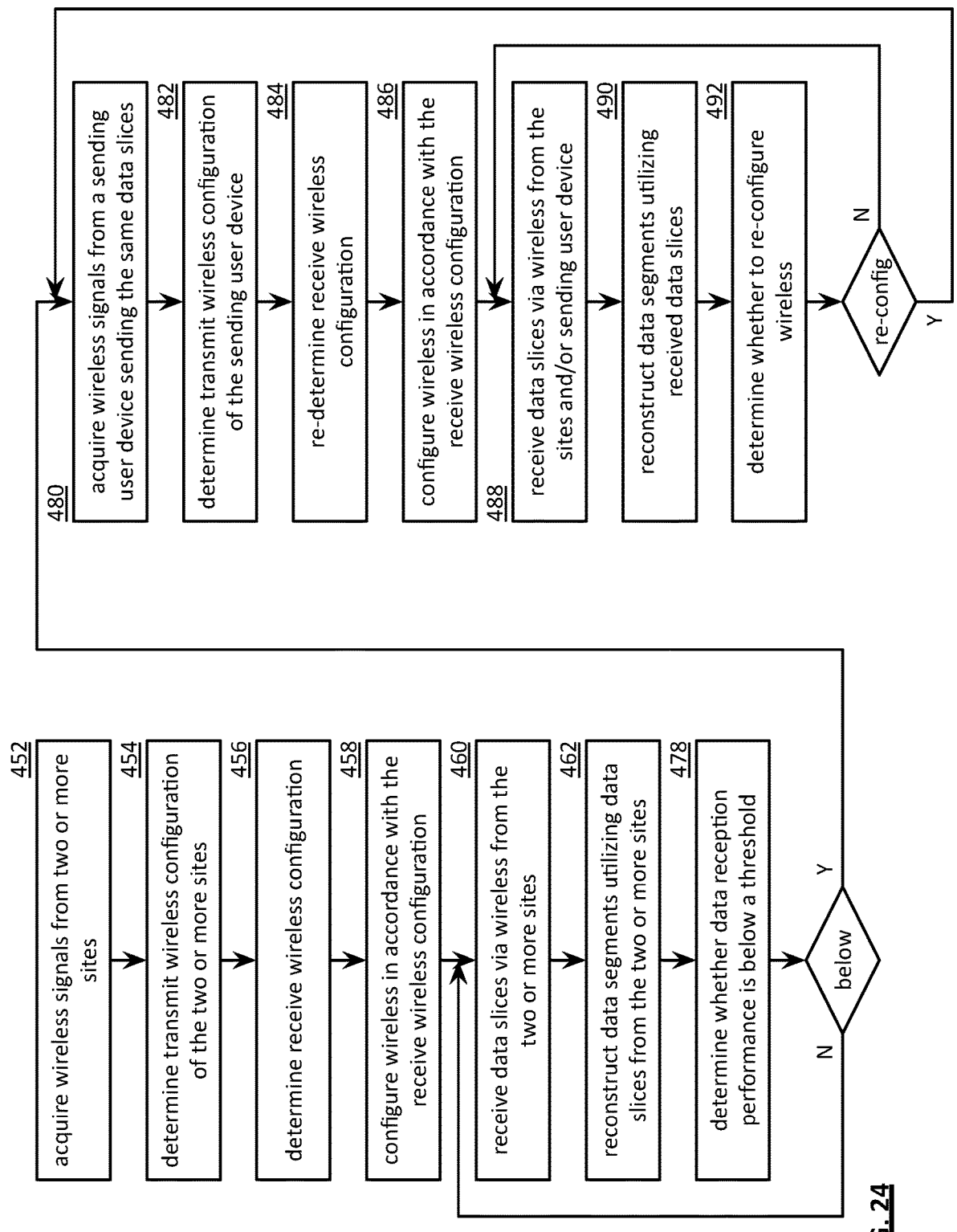
FIG. 24 is a flowchart illustrating another example of acquiring a content broadcast in accordance with the invention.

FIG. 24 is a flowchart illustrating another example of acquiring a content broadcast, which includes similar steps to FIG. 23. The method begins with steps 452-462 of FIG. 23 where a processing module (e.g., of a user device) acquires wireless signals from two or more sites, determines transmit wireless configuration of the two or more sites, determines a receive wireless configuration, configures transceiver (TR) wireless modules in accordance with the receive wireless configuration, receives encoded data slices via wireless communications from the two or more sites, and reconstructs data segments utilizing data slices from the two or more sites. The method continues at step 478 where the processing module determines whether data reception performance is below a performance threshold. The determination may be based on one or more of a received data rate indicator, a received data error indicator, a threshold, a comparison of data reception performance to the threshold, a wireless quality level indicator, an indicator of sites within range, an indicator of user devices within range, and a pillar to wireless communications path assignment indicator. The method repeats back to step 460 of FIG. 23 when the processing module determines that the data reception performance is not below a threshold. The method continues to step 480 when the processing module determines that the data reception performance is below a threshold.

The method continues at step 40 where the processing module acquires wireless signals from a sending user device transmitting copies of the encoded data slices. The wireless signal acquisition may be based on scanning wireless signals of the user device and/or sending a request message to another user device to request that it relay the copies of the encode slices. The method continues at step 482 where the processing module determines transmit wireless configuration of one or more of the sending user device based on receiving information from the user device and/or by extracting information from one or more pillar communications and of the two or more sites.

The method continues at step 484 where the processing module re-determines the receive wireless configuration based on the transmit wireless configuration of the sending user device and/or the transmit wireless configuration of the two or more sites. The processing module may determine to receive pillar communications from two or more sites and another user device. The method continues at step 486 where the processing module configures a wireless TR modules associated with the processing module in accordance with the receive wireless configuration. The method continues at step 488 where the processing module receives encoded data slices (e.g., including copies) via wireless from the two or more sites and/or the sending user device.

The method continues at step 490 where the processing module decodes the received encoded data slices in accordance with an error coding dispersal storage function to produce reconstructed data segments. The method continues at step 492 where the processing module determines whether to reconfigure the wireless based on the wireless performance and/or the received data. The method repeats back to step 488 when the processing module determines not to reconfigure the wireless. The method loops back to the step 480 when the processing module determines to reconfigure the wireless.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for execution by a computing device of a storage network, the method comprising:
   determining storage performance for a set of storage resources of the storage network, wherein data is error encoded into pluralities of sets of encoded data slices in accordance with error encoding parameters, wherein, for a set of encoded data slices of the pluralities of sets of encoded data slices, the error encoding parameters include a decode threshold number and a pillar width, wherein a plurality of encoded data slices included in the pluralities of sets of encoded data slices are stored via the set of storage resources of the storage network, and wherein the plurality of encoded data slices stored via the set of storage resources of the storage network includes a first number of encoded data slices;
   determining a storage provisioning implementation for the set of storage resources based on the storage performance and a storage performance threshold;
   facilitating the storage provisioning implementation to produce an updated set of storage resources based on:
      adding an additional set of storage resources to the set of storage resources to produce the updated set of storage resources;
      generating a new plurality of encoded data slices to produce an updated plurality of encoded data slices that includes the new plurality of encoded data slices; and
      storing the new plurality of encoded data slices in the updated set of storage resources, wherein at least some of the new plurality of encoded data slices are stored in the additional set of storage resources; and
   maintaining storage of the set of encoded data slices in accordance with the storage provisioning implementation, wherein the decode threshold number of encoded data slices of the set of encoded data slices remains available during the facilitating the storage provisioning implementation.

2. The method of claim 1, wherein determining the storage provisioning implementation includes determining to expand storage associated with the set of storage resources.

3. The method of claim 2, wherein facilitating the storage provisioning implementation to expand the storage includes at least one of: adding a memory device to the set of storage resources or adding a storage unit to the set of storage resources.

4. The method of claim 2, wherein facilitating the storage provisioning implementation to expand the storage includes allocating more memory of an already provisioned memory device associated with the set of storage resources.

5. The method of claim 2, wherein facilitating the storage provisioning implementation to expand the storage comprises:
   retrieving the decode threshold number of encoded data slices from the set of storage resources;

decoding the decode threshold number of encoded data slices to produce a data segment of the data, wherein the set of encoded data slices represent the data segment; and error encoding the data segment to produce an additional encoded data slice for the set of encoded data slices.

6. The method of claim 1, wherein determining the storage provisioning implementation includes determining to contract storage associated with the set of storage resources.

7. The method of claim 6, wherein facilitating the storage provisioning implementation to contract the storage includes deleting a memory device associated with the set of storage resources.

8. The method of claim 6, wherein the facilitating the storage provisioning implementation to contract the storage includes deleting a storage unit associated with the set of storage resources from the updated set of resources.

9. The method of claim 6, wherein facilitating the storage provisioning implementation to contract the storage includes deallocating memory of already provisioned memory devices associated with the set of storage resources.

10. The method of claim 1, wherein the storage performance includes a memory device up time associated with the set of storage resources.

11. The method of claim 1, wherein the storage performance includes a mean time to failure associated with the set of storage resources.

12. The method of claim 1, wherein the storage performance includes at least one of: an access latency associated with the set of storage resources or an access bandwidth associated with the set of storage resources.

13. The method of claim 1, wherein the determining the storage provisioning implementation is further based on receiving a storage provisioning command.

14. The method of claim 1, wherein the determining the storage provisioning implementation includes determining new error encoding parameters for the set of encoded data slices.

15. The method of claim 14, wherein the new error encoding parameters include increasing the pillar width.

16. The method of claim 14, wherein the new error encoding parameters include decreasing the pillar width.

17. The method of claim 1, wherein the updated plurality of encoded data slices includes a second number of encoded data slices, and wherein the second number is greater than the first number.

18. The method of claim 17 further comprises:

removing a second number of storage resources from the updated set of storage resources to produce a second updated set of storage resources storing a second updated set of encoded data slices, wherein the second number of storage resources stored a number of encoded data slices of the updated set of encoded data slices, and wherein a second number of encoded data slices in the second updated set of encoded data slices is equal to or greater than the decode threshold number.

19. The method of claim 1, wherein generating the new plurality of encoded data slices includes re-encoding at least some of the data to generate the new plurality of encoded data slices.

20. The method of claim 19, wherein re-encoding the at least some of the data to generate the new plurality of encoded data slices includes applying a new pillar width to generate the new plurality of encoded data slices, and wherein, based on addition of the additional set of storage resources, the new pillar width is greater than the pillar width utilized to generate the plurality of encoded data slices.

* * * * *